US012786216B2

(12) United States Patent
Villella et al.

(10) Patent No.: US 12,786,216 B2
(45) **Date of Patent: *Nov. 3, 2026**

(54) ANALYTICS FOR PROCESSING INFORMATION SYSTEM DATA

(71) Applicant: LogRhythm Inc., Broomfield, CO (US)

(72) Inventors: Phillip Villella, Boulder, CO (US); Daniel Kaslovsky, Boulder, CO (US); Dean Wyatte, Boulder, CO (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/372,405

(22) Filed: Sep. 25, 2023

(65) Prior Publication Data

US 2024/0305657 A1 Sep. 12, 2024

Related U.S. Application Data

(63) Continuation of application No. 15/874,596, filed on Jan. 18, 2018, now Pat. No. 11,777,963.

(Continued)

(51) Int. Cl.

| | |
|---|---|
| ***H04L 9/40*** | (2022.01) |
| ***G06F 15/76*** | (2006.01) |
| ***G06N 3/088*** | (2023.01) |
| ***G06N 7/01*** | (2023.01) |
| ***G06N 20/00*** | (2019.01) |
| ***G06N 20/10*** | (2019.01) |
| ***H04L 41/0604*** | (2022.01) |

(Continued)

(52) U.S. Cl.

CPC .......... *H04L 63/1425* (2013.01); *G06F 15/76* (2013.01); *G06N 3/088* (2013.01); *G06N 7/01* (2023.01); *G06N 20/00* (2019.01); *G06N 20/10* (2019.01); *H04L 41/0604* (2013.01); *H04L 41/14* (2013.01); *H04L 43/04* (2013.01); *H04L 63/20* (2013.01); *H04L 63/1416* (2013.01)

(58) Field of Classification Search

None

See application file for complete search history.

(56) References Cited

U.S. PATENT DOCUMENTS

| | | | | |
|---|---|---|---|---|
| 8,682,812 | B1 * | 3/2014 | Ranjan .................. | H04L 43/028 706/12 |
| 8,887,281 | B2 | 11/2014 | Honig et al. | |

(Continued)

OTHER PUBLICATIONS

International Search Report and Written Opinion, dated Aug. 13, 2018, for Application No. PCT/US2018/019554.‡

*Primary Examiner* — Trang T Doan

(57) ABSTRACT

A processing pipeline for supporting machine-learning processes for network monitoring and information management as well as specific analytics for particular use cases. The processing pipeline 500 takes in system data (502) and pre-processes (504) the system data. The system data (502) may include any of the types of data described above including text log files, and categorical data from various sources. The illustrated processing pipeline 500 includes two branches; a data fitting branch (506) where a model is developed for the data and a data transformation branch (508) where the developed model is leveraged to transform live data. For certain event detection use cases, the output of the data transformation branch (508) includes a score (510) (e.g., a threat level score) and an attribution (512).

20 Claims, 20 Drawing Sheets

Related U.S. Application Data

(60) Provisional application No. 62/463,405, filed on Feb. 24, 2017.

(51) Int. Cl.
*H04L 41/14* (2022.01)
*H04L 43/04* (2022.01)

(56) References Cited

U.S. PATENT DOCUMENTS

| | | | | |
|---|---|---|---|---|
| 9,112,895 | B1 * | 8/2015 | Lin | H04L 63/1425 |
| 9,699,049 | B2 | 7/2017 | Gupta | |
| 9,729,727 | B1 * | 8/2017 | Zhang | H04M 15/56 |
| 10,104,113 | B1 * | 10/2018 | Stein | H04L 63/1425 |
| 10,158,652 | B2 | 12/2018 | Muddu | |
| 10,397,246 | B2 | 8/2019 | Raff | |
| 10,419,465 | B2 ‡ | 9/2019 | Muddu et al. | G06F 40/134 |
| 10,594,711 | B2 | 3/2020 | Levin | |
| 10,728,119 | B2 | 7/2020 | Parandehgheibi | |
| 10,874,355 | B2 | 12/2020 | Vaughan | |
| 11,310,247 | B2 | 4/2022 | Manadhata | |
| 2007/0192863 | A1 * | 8/2007 | Kapoor | G06F 21/55 726/23 |
| 2013/0031633 | A1 * | 1/2013 | Honig | H04L 63/14 726/23 |
| 2015/0381637 | A1 * | 12/2015 | Raff | H04L 63/0218 726/23 |
| 2016/0088006 | A1 * | 3/2016 | Gupta | G06N 20/00 706/12 |
| 2016/0217378 | A1 * | 7/2016 | Bellala | G05B 23/024 |
| 2016/0358099 | A1 * | 12/2016 | Sturlaugson | G06N 5/043 |
| 2016/0359680 | A1 * | 12/2016 | Parandehgheibi | G06F 16/122 |
| 2017/0063908 | A1 * | 3/2017 | Muddu | G06F 16/24578 |
| 2017/0069216 | A1 * | 3/2017 | Vaughan | A61B 5/7275 |
| 2018/0152465 | A1 * | 5/2018 | Levin | H04L 67/10 |
| 2018/0176241 | A1 * | 6/2018 | Manadhata | H04L 67/306 |

* cited by examiner
‡ imported from a related application

| FIELD | OPTIONAL | DESCRIPTION | LOG MANAGER | EVENT MANAGER |
|---|---|---|---|---|
| SIP (INTEGER) | YES | SOURCE IP ADDRESS REPRESENTED AS AN 8 BYTE INTEGER. | YES | YES |
| DIP (INTEGER) | YES | DESTINATION IP ADDRESS REPRESENTED AS AN 8 BYTE INTEGER. | YES | YES |
| SPort (INTEGER) | YES | SOURCE TCP/UDP PORT NUMBER. | YES | YES |
| DPort (INTEGER) | YES | DESTINATION TCP/UDP PORT NUMBER. | YES | YES |
| ProtocolID (INTEGER) | YES | THE PROTOCOL ASSOCIATED WITH THE LOG AS DETERMINED BY PARSING EITHER THE PROTOCOL NAME OR IANA NUMBER. | YES | YES |
| LOGIN (CHAR 50) | YES | THE VALUE PARSED FOR LOGIN. | YES | YES |
| SName (CHAR 100) | YES | VALUE PARSED FOR SOURCE HOST NAME. | YES | YES |
| DName (CHAR 100) | YES | VALUE PARSED FOR DESTINATION HOST NAME. | YES | YES |
| PERSON (CHAR 50) | YES | VALUE PARSED PERSON FIELD (E.G., JOE BLOW, JANE DOE). | NO | YES |
| ACTION (CHAR 50) | YES | VALUE PARSED FOR ACTION (E.G., LOGIN, LOGOUT, REBOOT) | NO | YES |
| RESULT (CHAR 50) | YES | VALUE PARSED FOR RESULT (E.G., SUCCESS, FAILURE, ERROR) | NO | YES |
| PROGRAM (CHAR 50) | YES | VALUE PARSED FOR PROGRAM (E.G., PROGRAM NAME, PID) | NO | YES |
| OBJECT (CHAR 255) | YES | VALUE PARSED FOR OBJECT (E.G., C:\WINNT\CMD.EXE) | NO | YES |
| UserField1 (CHAR 50) | YES | VALUE PARSED FOR STORAGE IN USER FIELD 1 | NO | YES |
| UserField2 (CHAR 50) | YES | VALUE PARSED FOR STORAGE IN USER FIELD 2 | NO | YES |
| UserField3 (CHAR 50) | YES | VALUE PARSED FOR STORAGE IN USER FIELD 3 | NO | YES |

FIG. 2

| FIELD | OPTIONAL | DESCRIPTION | LOG MANAGER | EVENT MANAGER |
|---|---|---|---|---|
| UserField4 (CHAR 255) | YES | VALUE PARSED FOR STORAGE IN USER FIELD 4 | NO | YES |
| UserField5 (CHAR 255) | YES | VALUE PARSED FOR STORAGE IN USER FIELD 5 | NO | YES |

FIG. 2
(CONTINUED)

| FIELD | OPTIONAL | DESCRIPTION | LOG MANAGER | EVENT MANAGER |
|---|---|---|---|---|
| MsgClassID (INTEGER) | | A FOREIGN KEY REFERENCE TO THE LOG'S CLASSIFICATION. | YES | YES |
| CommonEventID (INTEGER) | | A FOREIGN KEY REFERENCE TO THE LOG'S COMMON EVENT RECORD. | YES | YES |
| MPERuleID (INTEGER) | | A FOREIGN KEY REFERENCE TO THE MPE RULE THAT MATCHED THE LOG MESSAGE. | YES | YES |
| PRIORITY (INTEGER) | | THE RISK-BASED PRIORITY CALCULATED FOR THE LOG/EVENT. | YES | YES |
| DIRECTION (INTEGER) | | THE DIRECTION OF THE LOG/EVENT. | YES | YES |
| SHostID (INTEGER) | | A FOREIGN KEY REFERENCE TO THE LOG/EVENT SOURCE HOST RECORD (IF DETERMINED). | YES | YES |
| DHostID (INTEGER) | | A FOREIGN KEY REFERENCE TO THE LOG/EVENT SOURCE HOST RECORD (IF DETERMINED). | YES | YES |
| ServiceID (INTEGER) | | A FOREIGN KEY REFERENCE TO THE LOG APPLICABLE SERVICE/PROGRAM (IF DETERMINED). | YES | YES |

150

FIG. 3

One-hot vectorization 700 702

| Color |
|---|
| Red |
| Blue |
| Green |
| Red |
| Green |

===>

| Red | Blue | Green |
|---|---|---|
| 1 | 0 | 0 |
| 0 | 1 | 0 |
| 0 | 0 | 1 |
| 1 | 0 | 0 |
| 0 | 0 | 1 |

FIG. 7A

Count vectorization 700 704

| Color |
|---|
| Red |
| Blue |
| Green |
| Red |
| Green |

===>

| Red | Blue | Green |
|---|---|---|
| 2 | 1 | 2 |

FIG. 7B

ANALYTICS FOR PROCESSING INFORMATION SYSTEM DATA

CROSS REFERENCE

This application is a continuation patent application of U.S. application Ser. No. 15/874,596, entitled "ANALYTICS FOR PROCESSING INFORMATION SYSTEM DATA," filed Jan. 18, 2018, which claims the benefit of U.S. Provisional Patent Application No. 62/463,405, entitled "PROCESSING PIPELINE FOR MONITORING INFORMATION SYSTEMS," filed Feb. 24, 2017, the contents of which are incorporated herein by reference in full and priority from these applications are claimed to the full extent allowed by U.S. law.

BACKGROUND

1. Field of the Invention

The present invention relates in general to network monitoring and information management for identifying threats and other types of events of interest and, in particular, to analytical tools for identifying such events of interest and a processing pipeline for supporting the analytical tools.

2. Relevant Background

Modern organizational infrastructures (e.g., made up of routers, switches, file servers, and the like) are constantly generating a large volume of data (e.g., log messages, machine-readable data, etc.) that is typically analyzed by various types of security and event management products that are configured to intelligently process the data to identify various events of interest. Such systems and the data they process are often referred to as SIEM (Security Information and Event Management) systems and data, and that term is employed herein for convenience, without limiting the scope of the discussion. For instance, many SIEM systems include a user interface in the form of a dashboard that allows troubleshooters and other entity personnel to view a display (e.g., list, map, etc.) of such identified events and take remedial action if necessary. Each graphically displayed event may include or allow the personnel to view various types of information including but not limited to a classification of the event (e.g., "compromise," "denial of service," etc.), normalized time stamps corresponding to when the event was first detected, a source of the data, etc. Personnel may also be able to drill down into the event on the dashboard to obtain more detailed information such as the original (e.g., pre-processed or raw) data, metadata about the same, and/or the like. These systems are continuously challenged to identify and classify emerging security or cyber threats.

SUMMARY

SIEM systems perform a number of functions related to information management such as information collection, storage, retrieval and the like. In connection with performing these functions, SIEM systems generally includes analytics, built-on or integrated into the SIEM system, for anomaly detection. An activity that departs in some manner from expected or benign behavior is identified as an event for further analysis. Analysis then attempts to distinguish unusual but harmless behavior from events requiring further processing, e.g., by generating an alarm or otherwise escalating consideration or by taking some remedial action such as limiting access to affected information systems.

Conventionally, anomaly detection and processing has been rules-based. An organization's data can be analyzed to establish certain fingerprints that characterize expected and benign behavior. This may be characterized in relation to various parameters related to, for example, accessed systems, accessing systems, failed logins, etc. Based on this fingerprint analysis, rules can be developed to identify and classify events based on a degree and/or character of departure from the fingerprints. Significant subject matter expertise is embodied in the rules to distinguish anomalous but benign activities from activities that may constitute true threats. In this regard, it is important to be sufficiently inclusive that true threats are not missed while being sufficiently selective so as to avoid alarm fatigue due to excessive false positives. Depending on the use case, the rules may optimize sensitivity (true positive rate) and/or specificity (true negative rate).

Unfortunately, the nature of the events of interest is constantly evolving due to, among other things, the efforts of miscreants and the dynamic information environments of organizations. Consequently rules may fail to identify emerging threats that masquerade as benign activity or otherwise fail to trigger static threshold-based identification, or may identify benign behavior as an event due to changing workgroup responsibilities, reconfiguration of resources, or other harmless changes to the information environment. The result is that rules often need to be manually tuned and monitored for effectiveness, and may not always provide optimal protection.

The present inventors have recognized that certain advanced analytics including machine-learning analyses can be advantageously applied in STEM contexts and have developed processes for supporting the analytics in this environment. In the latter regard, a processing pipeline has been developed that supports the advanced analytics. The processing pipeline, as will be developed in more detail below, generally includes a first processing branch for developing a model for a data environment and a second branch for evaluating live data against the developed model. The analytics may alternatively or additionally include statistical processes or computational algorithms.

One category of advanced analytics that can be supported by the processing pipeline is machine-learning analytics. Machine-learning is a well-known field that relates to computer-based tools that can learn from and make predictions concerning data without being explicitly programmed as to the details for the analysis. The value of machine-learning has been recognized in many contexts where it is desired to recognize patterns in complex data. Some analysts have therefore considered whether machine-learning might be applied in SIEM contexts.

However, there are a number of features of the SIEM environment that confound efforts to implement machine-learning processes. Many conventional machine-learning environments process tabular, numeric data. This data can be readily characterized by a labeled feature space representation. This, in turn, lends itself to data modeling and development of sets of optimal training data that seed and support the machine-learning process. This can result in supervised classification of this data that is often accurate and reliable.

By contrast, the raw system data ingested by STEM systems typically includes categorical non-numeric data, e.g., text-based log files. The data lacks any natural feature space representation. It is generally unstructured and difficult to parameterize. Moreover, labeled, ground-truth training data is often unavailable. Rather, the system data may require unsupervised pattern recognition and anomaly detection. Due to these challenges, some analysts who have considered the possibility of applying machine-learning to SIEM contexts have concluded that these contexts are fundamentally different from other applications where machine-learning has been beneficially employed. See *Outside the Closed World: On Using Machine Learning For Network Intrusion Detection*, Sommer and Paxson, 2010 IEEE Symposium on Security and Privacy, DOI 10.1109/SP.2010.25.

The present invention provides a processing pipeline for supporting advanced analytics for network monitoring and information management as well as specific analytics for particular use cases. The invention thereby frees monitoring systems from static signatures and predefined rules such that the systems can identify and classify emerging threats, adapt to changing information environments and continuously optimize performance. The analytics enable efficient and accurate modeling of baseline behavior as well as anomaly detection and attribution. In this regard, attribution refers to the process of relating, to end users, the reason(s) a specific analytic method came to the determination/conclusions that it did. For example, it will be appreciated that it is useful for users to know not only that a particular anomaly is deemed to present a significant security threat, but why it is deemed to present a significant security threat.

In accordance with one aspect of the present invention, a method and apparatus ("utility") is provided for using advanced analytics to analyze data from one or more information systems ("system data"). In a preferred implementation, the utility involves a processing pipeline with two processing branches. In a first branch, the system data is processed and analyzed to develop a model or baseline in a process referred to as data fitting. In a second branch, the system data is analyzed to apply the developed model to live data so as to provide information regarding an event of interest, e.g., identification and/or characterization of the event in a process referred to as data evaluation. The branches may process different or overlapping system data. For example, a first set of data may be processed by the first branch to develop a model of the data. Subsequently, live data may be processed by the second branch for event detection. The live data or a portion thereof may also be processed by the first branch (in real-time or subsequently) to further develop the data model.

A number of processing steps may be performed in connection with one or both of the processing branches. These steps may include; pre-processing the system data to prepare the data for the advanced analytics; executing the advanced analytics on at least a portion of the pre-processing system data ("input data") so as to yield output data; and using the output data to provide the information regarding the event of interest. By appropriately preparing the system data, advanced analytics including, for example, a machine-learning process can be executed on system data thereby substantially improving event detection and analysis.

The pre-processing provides a data set suitable for the advanced analytics. In this regard, the particular pre-processing implemented may vary depending on the analytics implemented. By way of example, the pre-processing may include one or more of removing system data that is not required for a specific analytics use case, handling situations where values are missing that are required for the specific analytics use case, and supplementing the system data with information that may enhance the analysis. A set of data is thus provided that has attributes suitable for the specific analytics employed.

Preparing the data for the advanced analytics may further involve feature engineering. The analytics employed will learn to recognize some feature or set of features of the data that enable the process to discriminate between benign activity and events of interest. In many cases, this will involve defining dimensions for the data in relation to particular parameters, and assigning magnitudes or values in relation to those dimensions. As discussed below, a mathematical space is thereby defined in which baselines can be developed and anomalies can be detected and analyzed. However, as noted above, the system data may include categorical, non-numeric data without natural feature space representation. Accordingly, feature engineering may involve converting non-numeric data to numeric data and parameterizing the data in relation to a defined set of dimensions that support the particular analytics of a specific application and objective ("use case"). Examples of feature engineering techniques include data vectorization that can be used to encode aggregated information for successive time-slices of data, and graph tensor analysis that can be used to encode relational information for successive time-slices. Again, different feature engineering techniques can be used to support different analytics use cases and many other examples of feature engineering are possible. The feature data may also be scaled to facilitate comparison or combined analysis of data.

The advanced analytics can then be implemented on the resulting input data. Such analytics can be adapted to recognize any patterns in the data that discriminate between benign activities and events of interest and/or characterize events of interest. That is, the analytics can be used in either or both of two distinct stages of security analysis; anomaly detection and risk quantification. Anomaly detection refers to identifying an activity that departs in some manner from expected behavior. Risk quantification relates to evaluating anomalies, generally with and against additional data (e.g., threat intelligence, environmental context, etc.) in order to quantify the security risk. Without limiting the generality of the foregoing, the advanced analytics process can conform to the anomaly detection paradigm, albeit without being constrained to pre-defined rules defining a static signature and defining static rules/thresholds for identifying anomalies and events of interest.

As noted above, the analytics are generally incorporated into a processing pipeline that includes a modeling branch and a live data processing branch that leverages the output of the modeling branch to analyze live data. The modeling branch can continuously apply analytics specific to the use case to the input data to develop and evolve baseline information. In a particular example, the baseline information can be developed in relation to a defined feature space representation of the data that may include multiple dimensions. In preferred implementations, optimal subspace models may be developed with respect to a subspace having reduced number of dimensions. For example, the baseline information may define a data manifold reflecting baseline conditions of the data in the multidimensional feature space. An anomaly can then be detected based on some notion of distance of a data point or set of data from the manifold. This enables meaningful scoring of anomalies as well as ranking of anomalies as is useful in various use cases. In this regard, scores for different entities (e.g., a particular user, host, connection, etc.) may be normalized to enable comparisons across the entities. More generally, though, input data can be provided to the analytics whereby data can be analyzed to yield output information for developing or updating a model of the learned environment or to monitor the learned environment.

A detected anomaly may then be evaluated in a security context, i.e., to determine whether the anomaly represents a security threat. In this regard, the processing pipeline may further involve post-processing of the data; that is, processing subsequent to anomaly or event detection. In many cases, it is desirable to know not only that data reflects an anomaly, but also to know why the data was deemed to reflect an anomaly. For example, it may be useful to know that a particular network user has engaged in anomalous behavior. However, it may be even more useful to know that the anomalous behavior involved accessing particular network resources that are unusual for that user. A monitor (human or machine) may quickly recognize that this anomaly is benign (e.g., that it is due to a change in work responsibilities) or suspicions (e.g., that there is no apparent justification for that user to access the identified resources). Accordingly, the processing pipeline may provide attribution information for the anomaly. Such attribution information may include context information for the anomaly or aggregated context information (e.g., a histogram of implicated users/addresses).

A variety of other post-processing can be implemented. For example, feedback may be provided concerning identified anomalies to tune the performance of the analytics, e.g., to reinforce learning and implement active learning. In this manner, for example, false positives can be reduced to avoid anomaly fatigue. The algorithms and post-processing can be implemented so as to improve sensitivity and/or specificity. Moreover, archived data may be run on current algorithms (e.g., the current state of the analytics) to retroactively analyze the data. Also, particular patterns or threats recognized by the analytics may be aggregated with those of other data systems or organizations to crowd-source information.

The present inventors have also developed specific analytics for particular network monitoring and information management use cases. Such analytics may involve one or more machine-learning algorithms.

In accordance with a further aspect of the present invention, a framework (including structure and methodology) for developing and implementing advanced analytics is provided. The framework involves identifying a use case (e.g., detection of compromised user accounts, detecting a compromised network of endpoint, or detecting operational attributes or anomalies); developing an algorithm (e.g., a machine-learning algorithm) or combination of algorithms ("analytics") to provide appropriate output information for the use case; developing a data model to support the analytics and processing system data using the data model and analytics to provide the output information for the use case.

In the case of anomaly-based analysis, the functionality of the analytics can include one or more of, 1) representing baseline behavior (modeling); 2) identifying deviations from the baseline behavior (anomaly detection); 3) quantifying the degree of deviation (scoring), 4) scaling dimensions of a value range to enhance comparisons/combinations of different data points or sets or analysis of a single data point or set (normalization), and 5) making comparisons across entities (ranking). Such entities may be user accounts, hosts/endpoints, etc. Different algorithms may have different relative advantages for different ones of these functions in different information system environments and use cases. Moreover, combinations of different algorithms maybe useful to satisfy multiple objectives such as efficient anomaly detection and attribution of an anomaly to a particular dimension of mathematical space.

The algorithm may operate with respect to a defined vector space, a graph-based mathematical representation or other mathematical representation of the data. In the exemplary case of vector space anomaly detection, the algorithm can include one or more of: 1) distance-based algorithms (relating to quantifying a distance of data from a defined reference with respect to one or more dimensions); classification-based algorithms (relating to maximizing separation between the nearest observations from each class); probability-based algorithms (relating to modeling the data as conditional and prior probabilities learned from training observations); and decomposition-based algorithms (involving decomposing the baseline into subspace components). These algorithms can be investigated in relation to the objectives of the use case to identify a set of one or more algorithms that provide optimized results in terms of anomaly detection, scoring, and attribution. Such optimization may take into account the desired sensitivity and/or specificity for the use case. In this manner, the analytics enable efficient and accurate anomaly detection, scoring, and attribution.

In accordance with another aspect of the present invention, an analytics fitting process is provided for use in the modeling stage of the analysis. The process involves obtaining system data, establishing a feature representation for the system data, and developing a model for the data using advanced analytics such as a machine learning process. The feature representation includes a number of features for characterizing the system data.

In certain implementations, the data model may include a subspace model that models the system data relative to a subset of the features. The subspace model may be developed using a set of system data that includes both normal data that is characteristic of normal behavior of one or more entities and anomalous data. The machine learning process may be applied to the set of system data so as to identify a subset of features that is statistically optimal for discriminating between the normal data and anomalous data. In one implementation, a decomposition-based algorithm such as a principal component analysis is employed to identify the subset of features for the subspace model. The subspace model may be used to define an activity manifold reflecting baseline behavior. The same or a different algorithm can then be used to identify and/or classify events in relation to deviations from the manifold.

In accordance with a still further aspect of the present invention, an analytics transformation process is provided. The transformation process involves obtaining system data, extracting features from the system data, executing analytics to apply a model, e.g., a subspace model, to the extracted features of the system data so as to identify an event of interest, and providing output information concerning the event of interest. The output information may include scoring information and attribution information for the event of interest. In this manner, analytics are applied to live data so as to enable a variety of use cases for network monitoring.

In addition to the exemplary aspects and embodiments described above, further aspects and embodiments will become apparent by reference to the drawings and by study of the following description.

BRIEF DESCRIPTION OF THE DRAWINGS

FIG. 2 illustrates a table of data fields specifying content that may be parsed or obtained from data such as log messages and populated into corresponding data fields that may be appended to or otherwise associated with the data in accordance with the present invention.

FIG. 3 illustrates another table of data fields specifying content that may be determined from data such as log messages and populated into corresponding data fields that may be appended to or otherwise associated with the data in accordance with the present invention.

FIGS. 7A and 7B illustrate vectorization of categorical data as numerical values in a matrix in accordance with the present invention.

FIG. 17 illustrates verification of a machine-learning model by using an injected anomaly in accordance with the present invention.

DETAILED DESCRIPTION

The present invention relates to using advanced analytics including machine-learning processes for network monitoring. In this regard, the invention involves a processing pipeline for supporting the analytics as well as specific analytics for supporting particular use cases. For purposes of illustration, much of the following discussion is set forth in the context of a SIEM system which, indeed, is an important application of the invention. However, various aspects of the invention are applicable in other environments such as monitoring information system health and usage patterns, understanding organizational needs and relationships, enforcing policies, and many others.

In addition, the following discussion illustrates a framework for selecting and optimizing particular analytics or combinations thereof for particular use cases and structuring a processing pipeline to support the selected analytics. In this regard, specific analytics for anomaly detection and evaluation with respect to vector space and graph-based feature representations are set forth. It will be understood however, that different analytics will be applicable to different use cases and may involve changes to the supporting processing pipeline. Accordingly, the following description should be understood as illustrating exemplary implementations of the invention and not by way of limitation.

The description below is generally divided into three sections. First, a representative SIEM system environment is described. As noted above, SIEM systems are one important application in which the invention may be deployed. The system described in the first section includes rules-based processing which is augmented by non-rules-based analytics in accordance with the present invention. That is, in a preferred implementation, all analytic methods, signature-based or otherwise, are brought to bear so as to apply the broadest set of capabilities to the problem. The system described in this section therefore provides context as well as functionality that can be leveraged by the inventive process.

Figure 1:
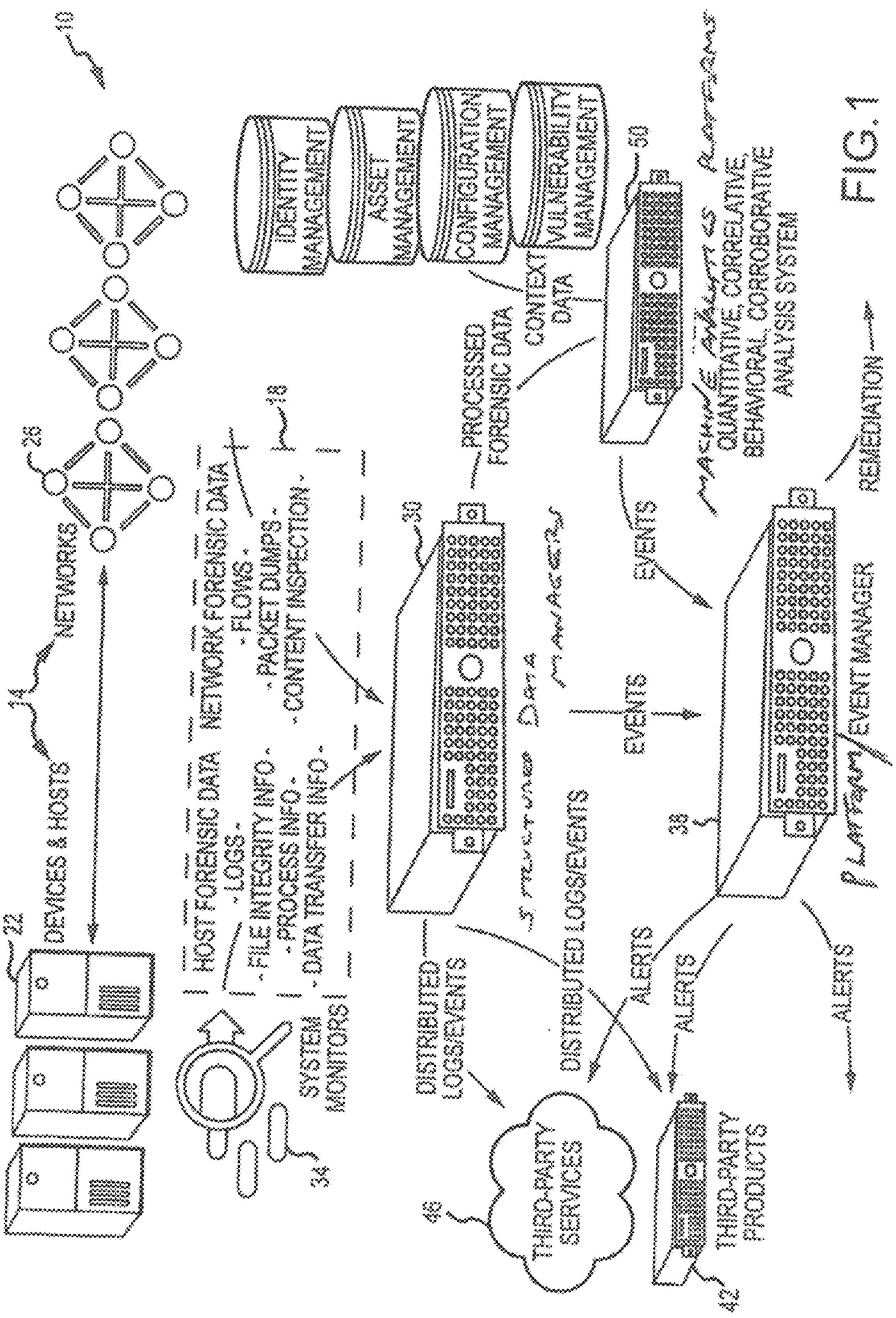
FIG. 1 is a block diagram of a system that provides for management of data generated by one or more data platforms and events associated therewith in accordance with the present invention.

Thereafter, the processing pipeline is described. The processing pipeline supports the application of advanced analytics to system data. Finally, specific analytics are described for particular use cases. While the invention is not limited to such specific analytics or use cases, they illustrate and elucidate certain aspects of the invention 1. SIEM System Environment Before discussing the processing pipeline and analytics disclosed herein in more detail, reference will be initially made to FIG. 1 which illustrates one representative environment in which such utilities may be employed, although it is to be understood that the disclosed utilities may be utilized in numerous other contexts as well. For instance, the system 10 of FIG. 1 may be that disclosed in U.S. Pat. No. 8,543,694 which is assigned to the assignee of the present application and which is incorporated herein by reference. The system 10 generally provides for: the collection and processing of various types of data generated by or gleaned from one or more devices, networks, processes, and the like; analysis thereof in numerous manners for detecting cyber threats and attacks; ensuring compliance with applicable reporting requirements, etc.; taking remedial actions; and the like. As shown, the system 10 may include one or more root data sources 14 that generate one or more types of data 18 that may be analyzed in numerous manners to extract meaningful information therefrom. The root data sources 14 may include hosts or devices 22 (e.g., computers, servers, routers, switches) and networks 26 (although numerous other forms of root data sources 14 are also envisioned), and may each generate numerous text files describing various occurrences or developments associated with the operations of the root data source 14. The generated text files may also be routinely updated by the root data sources 14 as various events transpire during the root data sources' 14 operations, a process that may be referred to as "logging." Additionally, while text files are often used for logging because of their readily manageable format, data such as log messages may come in other formats as well.

The root data sources 14 that generate the data 18 may come in a variety of configurations, with each being capable of generating a tremendous amount of data 18 such as log messages. For example, one of the devices 22 may be a computer (e.g., server, desktop, notebook, laptop, computer workstation, mainframe system) that is operable within a computer network configuration. In this regard, the computer may be responsible for delivering applications to other devices 22 or processes within the computer network, administering communications among computers within the computer network, controlling various features of the computer network, and the like. In the process of performing these functions, although partially dependent upon the number of computers within the network, the computer may generate thousands, millions, etc. of log entries per day. To illustrate, when a user incorrectly attempts to logon to a single computer on the computer network, the computer may generate a log entry noting a particular time (e.g., timestamp) that an improper procedure was performed. Other examples of occurrences or developments that may cause the generation of log messages include, inter alia, application launch failures, audit activity, attacks, operating system errors, and the like.

While the data 18 may be in the form of log messages or entries generated by or gleaned from root data sources 14, the data 18 may take numerous other forms as well. For instance, the data 18 generated by devices 22 may be in the form of host forensic data such as file integrity information, process information, data transfer information, and the like. As an additional example, the data 18 generated by networks 26 may be in the form of dataflows (i.e., recalculated values for dependent variables that depend on one or more changing independent variables), packet dumps, content inspection, and the like.

The system 10 of the present disclosure provides for the rapid/automated extraction of viable information from the data 18. One component or aspect of the system 10 that facilitates this purpose is one or more log or structured data managers 30 (e.g., processing platforms) communicatively coupled (via any appropriate wired or wireless network(s)) to the various root data sources 14 to receive the data 18 generated therefrom (e.g., collection). In this regard, each structured data manager 30 may use various protocols (e.g., syslog protocols, Netflow protocols) to communicate with the root data sources 14. In one arrangement, the system 10 may employ agents or system monitors 34 (e.g., software) that can operate on the individual root data sources 14 to extract data entries from registers or records of the root data sources 14. In some instances, the system monitors 34 are software protocols that are innate to the operating system of a root data source 14.

In the system described in this first section, each structured data manager 30 may broadly be configured to process received data 18 against any appropriate rule base (e.g., plurality of log processing rules) to identify a subset of data 18 (e.g., "events") that may be considered interesting to organizational analysts for various reasons. In one arrangement, each illustrated structured data manager 30 may be configured with a server process referred to as a message processing engine ("MPE") that is responsible for processing each piece or segment of data 18 against the rule base. Upon data 18 triggering a particular rule of the rule base, the MPE may automatically parse or obtain information from the data and populate one or more corresponding data or reporting fields according to instructions in the particular rule. The original (e.g., raw) data and populated data fields may together be considered an event that may be stored and made available to analysts, other system processes, and the like in any appropriate manner.

FIG. 2 presents a table of data fields that may be populated upon data 18 matching or otherwise triggering a processing rule. For instance, a tagging notation may be embedded in the processing rule that is used by the MPE to parse content from the data 18 for population into such data fields. As shown, various information may be parsed or obtained from the data and populated into corresponding data fields such as source/origin IP address, destination/impacted IP address, source/origin port number, destination/impacted port number, protocol identifier (ID), as source/origin host name, destination/impacted host name, and the like. In addition to parsing information from the structured data, the MPE or the like may also be configured to determine and populate various types of metadata into corresponding reporting fields such as processing rule ID, classification (e.g., "Audit: Access Failure," "Operations: Error," etc.), direction (e.g., internal, external), and the like. See table in FIG. 3. The structured data manager 30 (e.g., MPE) may write or store the original data text, parsed information, and/or determined metadata (e.g., collectively, an event) in one or more volatile and/or non-volatile storage mediums accessible by the structured data manager 30 and/or other system components, platforms and/or processes.

Figure 4:
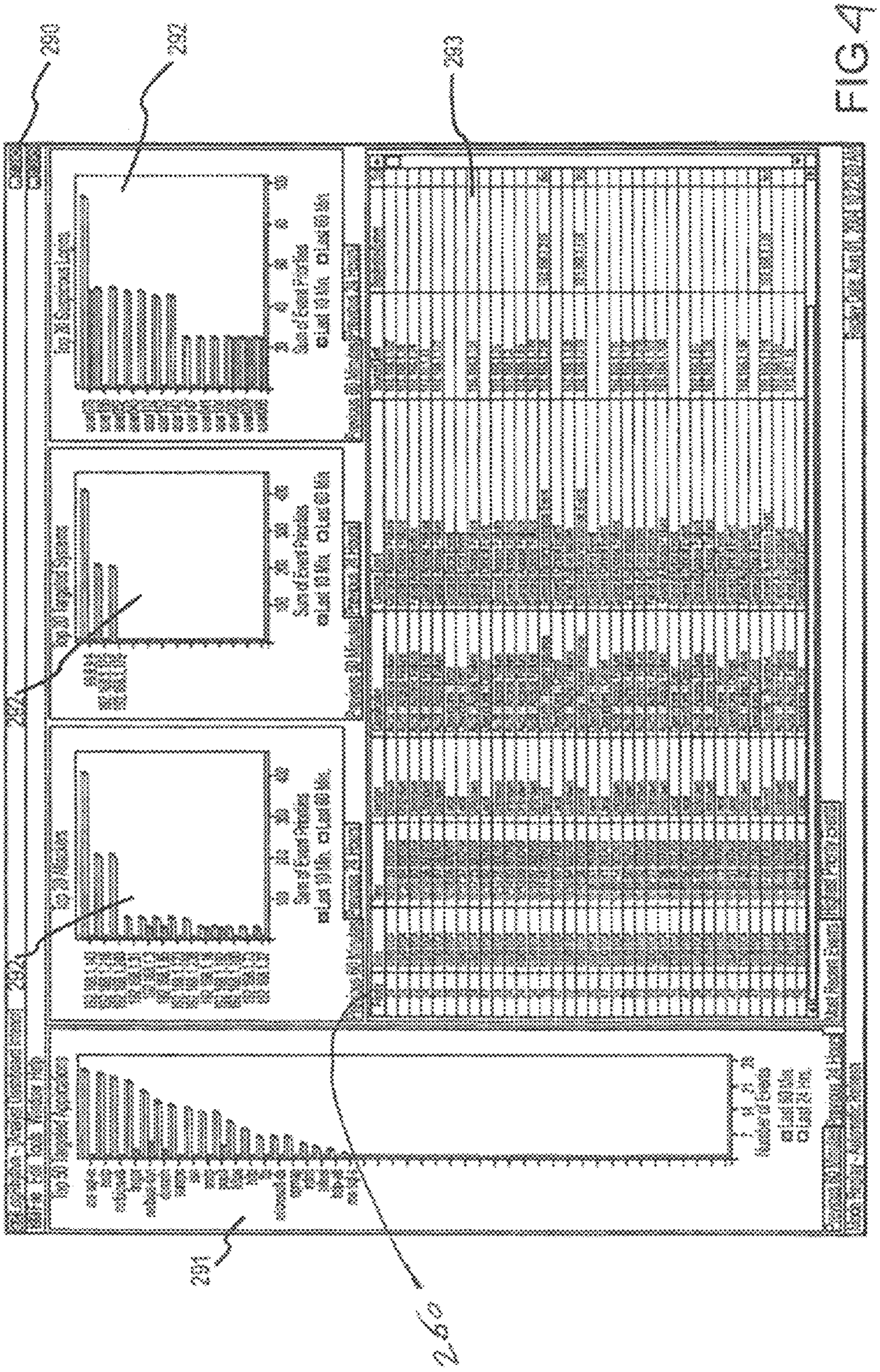
FIG. 4 illustrates a screenshot of a user interface that may provide information regarding data that has been collected and processed according to the utilities disclosed herein in accordance with the present invention

FIG. 4 presents a screenshot of a user interface that provides information regarding data that has been collected and processed according to one or more structured data managers 30 or the like (e.g., where each row may represent one or more "events") while FIG. 5 presents a screenshot resulting from a particular one of the rows of the screenshot of FIG. 4 being drilled down into by a user to present more detailed information regarding the event(s)(e.g., some or all of the parsed data and determined metadata discussed above).

Processing rules may also specify one or more additional actions the structured data manager 30 is to take upon data 18 matching or triggering a processing rule such as archiving the data or event in any appropriate archival data store, reporting, forwarding the structured data or event to (e.g., or otherwise triggering or alerting) an event or platform manager 38 to determine whether one or more alarms should be generated (e.g., by processing the events against any appropriate alarm rule(s), and/or the like). The various structured data managers 30 and event/platform managers 38 may transmit structured data, events, alerts and/or other data or messages to one or more third-party products 42 by way of any appropriate third-party services 46. Representative examples of structured data managers 30, system monitors 34, event/platform managers 38, and the like that may be used in conjunction with the system 10 may be found in U.S. Pat. No. 7,653,633 and U.S. Patent Application No. 61/360,815, the entire disclosure of each being hereby incorporated herein by reference.

In one arrangement, the system 10 may include one or more machine analytics platforms 50 broadly operable to analyze and process numerous types of data (e.g., data 18 received directly from the data sources 14; events or structured data generated by one or more log managers 30; data related to identity, asset, configuration and vulnerability management; etc.) using one or more processing rules to detect what may be complex events/conditions/developments/etc. occurring in relation to the data sources 14. In this regard, it will be appreciated that, in the context of rules-based processing, the analytics platform is not limited to use of traditional notions of "correlation." However, as will be understood from the description below, the advanced analytics including certain machine-learning algorithms, make use of modeling processes involving "correlation" as understood in that field. For instance, one machine analytics platform 50 may be configured to conduct one or more types of quantitative, correlative, behavioral and corroborative analyses to detect events from one or more disparate data sources, even when the data generated by the data sources may otherwise be considered unimportant or non-relevant when considered in a vacuum. In one arrangement, the machine analytics platforms 50 may be configured to parse data/determine metadata and populate corresponding data fields that may, together with the analyzed/processed structured data, be considered events that may be stored and/or forwarded to the event/platform manager 38 as appropriate. In one embodiment, the machine analytics platforms 50 may be in the form of the advanced intelligence engine disclosed in U.S. Pat. No. 8,543,694 which is assigned to the assignee of the present application and which is incorporated herein by reference. As discussed below, the system thus described may additionally implement advanced analytics such as machine-learning processes via an appropriate processing pipeline.

2. The Processing Pipeline

Figure 5A:
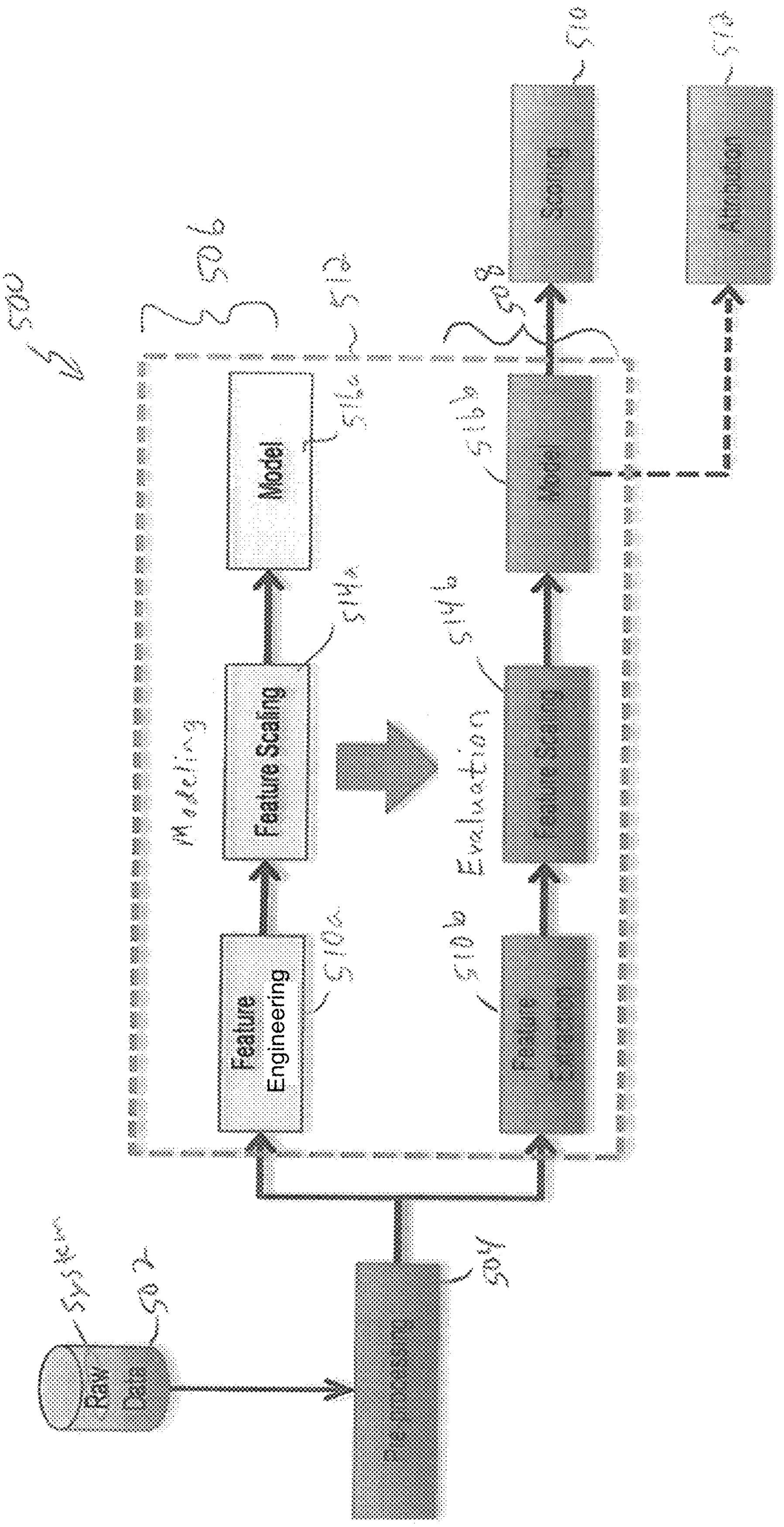
FIGS. 5A-5B illustrate alternate implementations of a processing pipeline to support machine-learning processes in accordance with the present invention.

FIG. 5A illustrates one implementation of a processing pipeline 500 in accordance with the present invention. Generally, the processing pipeline 500 takes in system data (502) and pre-processes (504) the system data. The system data (502) may include any of the types of data described above including text log files, and categorical data from various sources. The illustrated processing pipeline 500 includes two branches; a data fitting branch (506) where a model is developed for the data and a data evaluation branch (508) where the developed model is leveraged to evaluate live data. For certain event detection use cases, the output of the data evaluation branch (508) includes a score (510) (e.g., a threat level score) and an attribution (512). The score may be normalized to enable ranking across entities. Each of the system components is described in more detail below.

2.1 Pre-Processing

As noted above the system data 502 can include a variety of types of data from monitored network software/firmware/hardware platforms as well as other sources. Thus, the nature and structure of the data, as well as the source and time-frames of the data will vary depending on the use case. For example, in the SIEM context, the system data 502 may include host forensic data, network forensic data and context data, all as described above in connection with FIG. 1. The data may be extracted using a search tool. Where a search engine is utilized, tools may be developed to extract an appropriate data set, e.g., to extract all events for one login or all authentication events for all logins. In certain implementations, the forensic data may be processed forensic data as described above in connection with FIG. 1. Accordingly, the system data 502 may include structured log data. Though such data is structured (e.g., normalized and tabular) it may still include categorical non-numerical information.

With respect to data sources and timeframes, different data may be obtained for different use cases. In this regard, live stream data may be processed for substantially real-time event detection and analysis. Certain analyses may retroactively analyze a data set over a defined time window, e.g., to develop baselines or data trends. Still further, deep archival data may be processed for forensic analysis. Accordingly, the characteristics of the data (e.g., structured or unstructured), the content of the data (e.g., which machines and data fields), the source of the data (network or external platforms), and the timelines of the data (streaming, retroactive, deep archival), among other things, can vary depending on the use case.

As described above, system data such as STEM data is generally unsuitable for use in certain analytics, including in machine-learning processes, for event detection and evaluation. Among other things, the SIEM data includes categorical, non-numeric data without natural feature space representation. Moreover, some of the data may be incomplete or irrelevant for a particular application. The illustrated pre-processing module 504 pre-processes the system data 502 so that it is suitable for use in a machine-learning process. It receives system data as described above and outputs data appropriate for input to the feature engineering modules 510*a*, 510*b* as described above. As will be understood from the description below, the specific functionality of the pre-processing will vary in some details depending on the use case, data environment and machine-learning process employed, but some pre-processing is generally required to support a machine-learning process.

Some examples will illustrate typical pre-processing functionality. First, pre-processing may include filtering the data to remove data that is not useful for or interferes with modeling. In this regard, the data may be filtered to include only the data desired for a particular analysis, e.g., model building or processing live data. In addition, some analyses may be directed to a particular set of entities, e.g., a particular machine, set of machines, link, network, or other resources. In such cases, the system data 502 may be filtered to obtain a desired subset of data (e.g., login ends with ($)).

In some cases, the system data 502 may be missing values. There are a number of options for handling such missing values. For example, if the process is intolerant of particular missing values, this may be addressed by imputing one or more the missing values, assigning the values as unknown, or dropping the data that includes missing values. With regard to imputing missing values, in some cases, missing values may be inferred from the context or based on statistical analysis. For example, under certain circumstances, a host name may be inferred from other fields (e.g., IP address), or a missing value from a set of related fields may be inferred from the values of the other fields.

Various other information may be inferred. For example, consider the case where new observations are missing a login for User X but the behavior is otherwise consistent with User X based on, e.g., originIp, impactedIp, time of day, packets transmitted, etc. In such cases, a decision tree can be implemented to fit the observations to an entity and assign a confidence level. That is, the decision tree sets forth a series of decision nodes that map certain behavior patterns to certain entities.

While specific examples have been provided, it will be appreciated that a variety of tools may be developed for pre-processing the data depending on the data environment and use case. Those tools may be domain-general or domain-specific and may leverage knowledge embedded in systems as described in connection with FIG. 1.

2.2 Machine-Learning Process

The pre-processed data output by the pre-processing module 504 is suitable for use in a machine-learning process that is generally identified by reference numeral 512. It should be noted that the boundaries of the machine-learning process 512 as depicted in FIG. 5A are somewhat arbitrary as the input elements 502 and 504 as well as the output elements 510 and 512 are largely influenced by and characteristic of the machine-learning process 512 and could be conceptualized as part thereof. The illustrated boundaries of the machine-learning process generally capture, though, the portion of the processing pipeline 500 where logical tools learn from and characterize data (e.g., in the case of SIEM systems, anomaly detection and evaluation, scoring and attribution) without being explicitly programmed as to the details of the analysis.

The illustrated process 512 includes a modeling branch 506 and an evaluation branch 508. In the modeling branch 506, the process 512 learns some state from the data input into the process 512 ("input data"), i.e., the pre-processed data output by pre-processing module 504. In the evaluation branch 508, the learned state is used to evaluate the data (e.g., live streaming data), for example, to associate a score and an attribution with the data.

2.2.1 Feature Engineering

Each of the branches 506 or 508 is conceptually illustrated as including a feature engineering module 510*a*, 510*b*, a feature scaling module 514*a*, 514*b*, and modeling module 516*a*, 516*b*. As will be described in more detail below, the feature engineering modules 510*a*, 510*b* generally provide a mathematical representation of the input data. The feature scaling modules 514*a*, 514*b* generally relate to establishing meaningful notions of distance or magnitude for the features so as to enable comparison or other analysis. The modeling modules 516*a*, 516*b* develop some characterization of the data to support the particular use case under consideration, e.g., representing baseline behavior for detecting anomalies in the case of supporting automated detection of compromised user accounts based on authentication data. The branches 506 and 508 are shown as being composed of distinct modules to assist in understanding the separate modeling and evaluation functionalities. It will be appreciated, however, that the branches 506 and 508 may share or call upon common resources though, in many cases, operating at different times on different data sets.

The feature engineering modules 510*a*, 510*b* receive the pre-processed input data and construct a mathematical representation of the data. Among other things, this involves mapping categorical variables, lists and strings to numerical values in a metric space and encoding aggregated or relational information for successive data sets, e.g., corresponding to a time slice of data.

Figure 6:
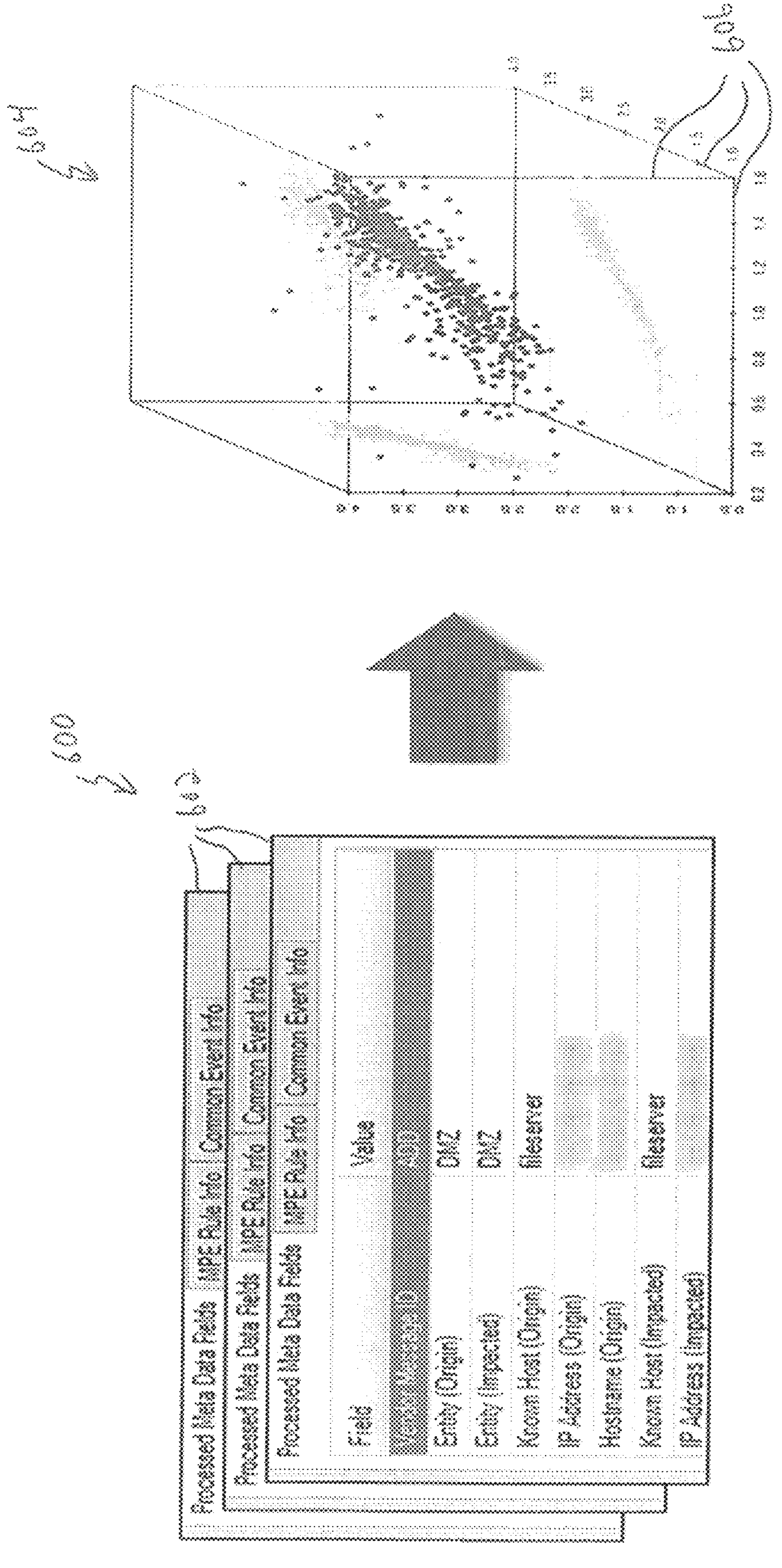
FIG. 6 is a conceptual illustration of mapping categorical variables, lists and strings to numerical values of a metric space in accordance with the present invention.

This is conceptually illustrated in FIG. 6. As illustrated, the input data 600 includes a series of successive data records 602. The illustrated records 602 include field and value information, at least some of which may be categorical or non-numerical in nature. The feature engineering modules 510*a*, 510*b* (FIG. 5*a*) map the record information to a metric space 604 where the information is assigned numerical values with respect to one or more dimensions or features 606 of the metric space 604.

Many different mathematical representations of the data are possible, and different mathematical representations support different models. In turn, different models may be better suited for different use cases as will be discussed below. For purposes of illustration, the following discussion will focus on the broad class of applications involving anomaly detection and evaluation (e.g., to determine a threat level associated with the anomaly) for network monitoring. In such applications, two important kinds of feature engineering are: 1) vectorization wherein aggregated information is encoded for every time slice; and 2) graph tensorization wherein relational information is encoded for every time slice. Vectorization generally yields an N×P matrix (N observations×P features). Graph tensorization generally yields an N×P×P tensor (N observations×P nodes×P nodes). Examples of each of these are set forth below.

As noted above, vectorization allows for representation of categorical data as numerical values in an N×P matrix. Thus, the resulting vector has P columns where each unique value of a field is assigned an index. Examples include one-hot vectorization and count vectorization. In one-hot vectorization, the index j corresponding to the value of observation i is set to 1. In count vectorization, the index j corresponding to value is set to N where N is the number of times the value occurred in a window of size t.

This is illustrated in FIGS. 7A and 7B. In each case, the input data 700 for a time slice includes observations for the field "Color" having values of "Red, Blue, Green, Red, and Green." In FIG. 7A, one-hot vectorization yields a matrix 702 having a number of rows equal to the number of observations where the column for each row matching the value of the observation is populated with the value 1. In FIG. 7B, count vectorization yields a matrix 704 with a single row, where each column is populated with a numerical value equal to the number of occurrences of the corresponding value aggregated over the time window.

As noted above, graph tensors can encode relational information for each time slice. In the case of SIEM data, logs generally consist of occurrences, co-occurrences and relationships. Graph tensors can be used to encode relational information including co-occurrences and relationships for time slices.

Figure 8A:
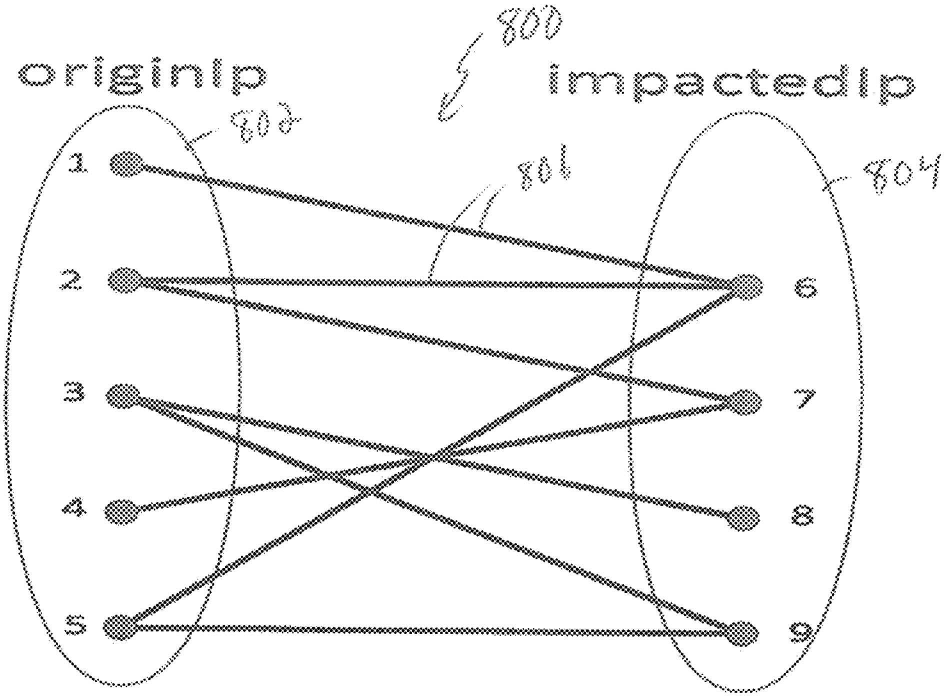
FIGS. 8A and 8B illustrate tensorization of relational data in accordance with the present invention.
Figure 8B:
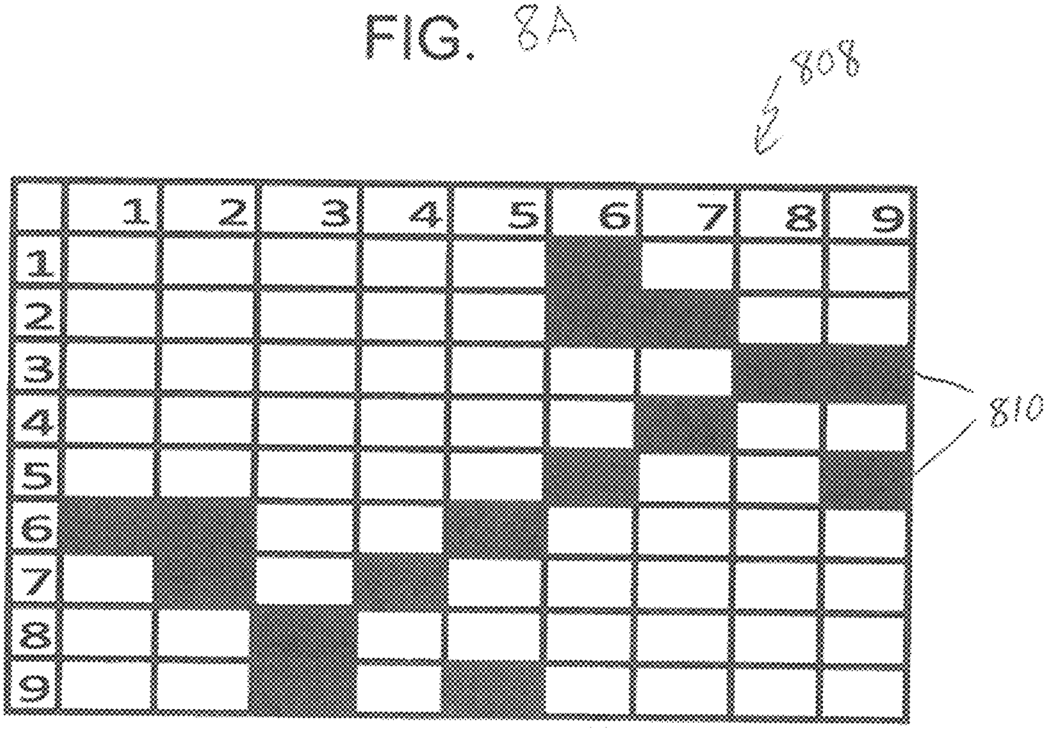

This is illustrated in FIGS. 8A-8B. FIG. 8A shows a network activity graph 800. Many logs include an origin or source IP address and impacted or destination IP address. In FIG. 8A the originIps are represented by the nodes 802 and the impactedIps are represented by the nodes 804. Relationships (e.g., representing occurrences of authentication requests involving a sourceIp-impactedIp pair) are represented by edges 806 connecting the relevant nodes.

FIG. 8B shows an adjacency matrix 808 encoding the same relationships or co-occurrences. Specifically, the darkened cells 810 of matrix 808 encode the connected pairs of nodes as indexed for the column/row indices. Values may be provided for each index. Each value is typically a count (e.g., number of connections, bytes transferred) that can be aggregated over a time window of length t. A stream of data can thus be represented as a series of adjacency matrices that can bethought of as stacked on top of each other in order of time. It is emphasized that the vectorization and graph tensorization processes described above are simply two examples of feature engineering. Feature engineering can be accomplished by a variety of other processes that are effective to represent categorical values as numerical values and map data to a mathematical representation that supports the machine-learning analytics desired for a particular use case.

2.2.2 Feature Scaling

Certain analyses performed on the data, as described below, involve comparative or combinative analysis. For example, event detection and analysis may involve consideration of multiple features. Moreover ranking of threats, e.g., in the use case of compromised account credentials, involves comparison of the results of separate analyses. For those and other reasons, it is important to provide scaling functionality with respect to the extracted feature data. This may involve scaling to a common range, weighting, mean removal and normalization.

Such functionality may be implemented by the feature scaling modules 514*a*, 514*b* (FIG. 5A). This can be understood in relation to the exemplary case of windowed count aggregation. As described above, one-hot encoding can yield a numerical representation suitable for vector space analysis. However, it is useful to aggregate the resulting data over time windows in the form of counts. Count aggregation yields a continuous valued representation of a time window that is more robust for computing various statistics (e.g., distance variance, etc.).

The feature scaling modules 514*a*, 514*b* can be operative to convert these aggregated counts to normalized ratios. For example, this may be implemented so that all the unique values are scaled to a common range that yields useful results. Such normalization scales all dimensions to the same range (or ranges that otherwise enhance comparisons/combinations), which is helpful both algorithmically and for visualization purposes.

It should be noted that it may be useful to retain both the scaled data and the unscaled, aggregated data. In this regard, when the data is scaled, the raw count magnitude is lost. That data may be useful in certain analyses. Accordingly, an analysis can use scaled data, unscaled data, or combinations of the two as appropriate, or additional transformations on counts such as logarithmic scaling.

Figure 9:
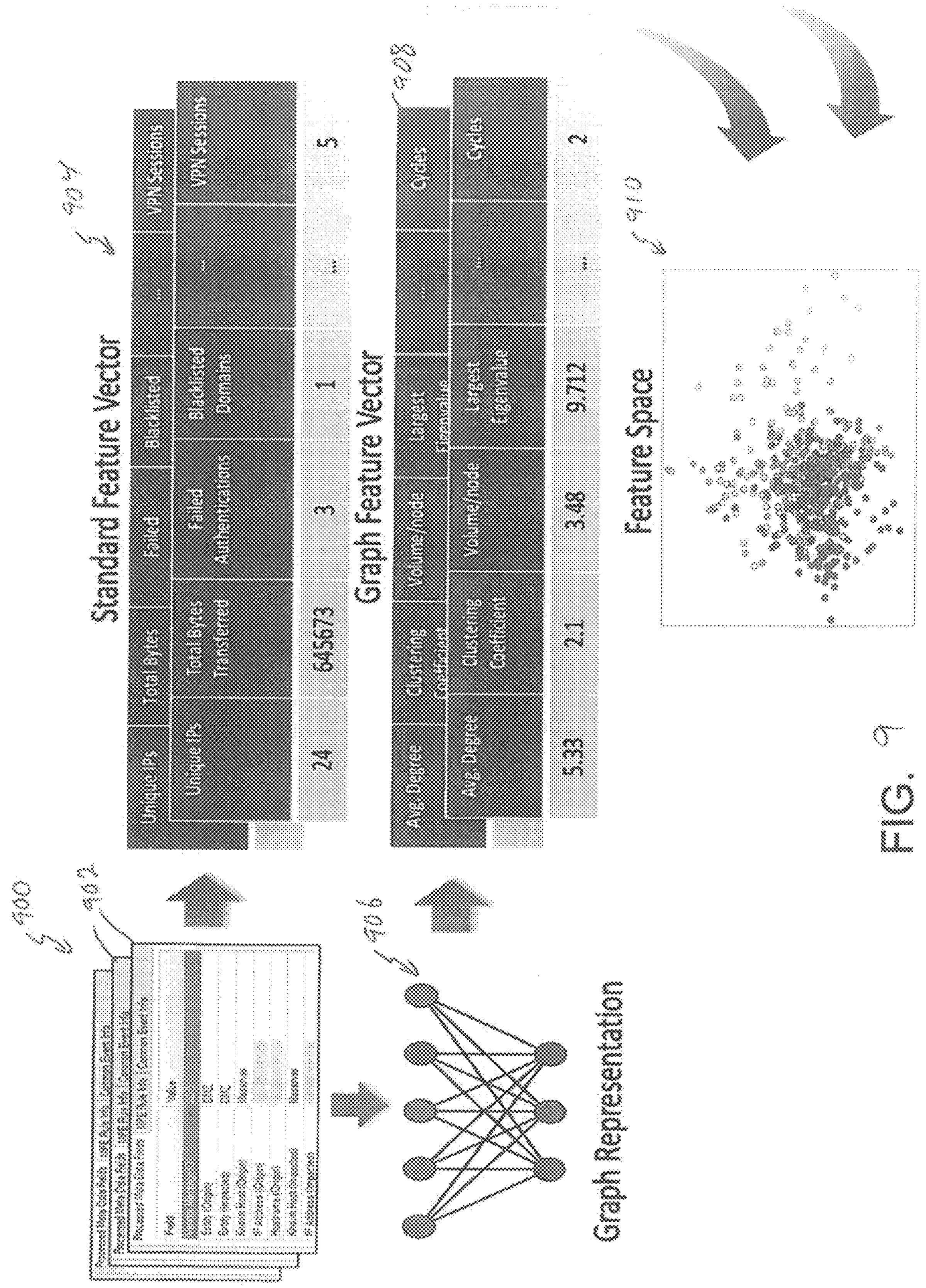
FIG. 9 illustrates a process for extracting features from input data including vectorization and tensorization in accordance with the present invention.

The feature engineering and scaling functionality can be summarized by reference to FIG. 9. The feature engineering modules receive a pre-processed input data stream 900 including a series of data records 902. Depending on the use case, an appropriate mathematical representation of the input data is constructed. For example, a vectorization process may be employed to represent that data stream 900 in the form of a standard feature vector 904. Additionally or alternatively, a tensorization process may be employed to provide a graph representation 906 of the input data 900. The graph representation 906 can then be processed to yield a graph feature vector 908. In either case, a feature space representation 910 of the input data 900 is provided that supports modeling.

2.2.3 Modeling

Generally, a goal of network monitoring and information management is to monitor or understand the operation or performance of an information system. This may be done for a variety of purposes including threat detection, generating performance parameters, ensuring compliance with policies, troubleshooting and projecting resource requirements. Modeling involves applying analytics that yield information relevant to any such inquiry. Such modeling can be implemented by the model modules 516*a*, 516*b* of FIG. 5A.

An important class of such analyses involves anomaly detection and evaluation. Anomaly detection is concerned with detecting a behavior or pattern of behavior that departs from a defined reference. That reference may be defined, for example, in relation to expected or normal patterns of behavior or behavior that is otherwise deemed benign or not of interest with respect to the analysis under consideration. Anomaly evaluation involves analysis of detected anomalies, often in conjunction with additional information concerning context, to distinguish anomalous but benign behavior from behavior representing a threat, as well as ranking, scoring or otherwise quantifying the threat level.

By way of example, the modeling discussion below initially focuses on anomaly detection. The general process involves defining a baseline in relation to some set or evolving collection of data, and analyzing another (perhaps overlapping) set or stream of data to identify anomalies where the data under analysis departs from the baseline in some manner of interest. In a subsequent evaluation process, some or all of those anomalies may be deemed events that can be scored, ranked and associated with an attribution. The resulting output information can be used in a network monitoring and information management system such as a STEM system.

Figure 10:
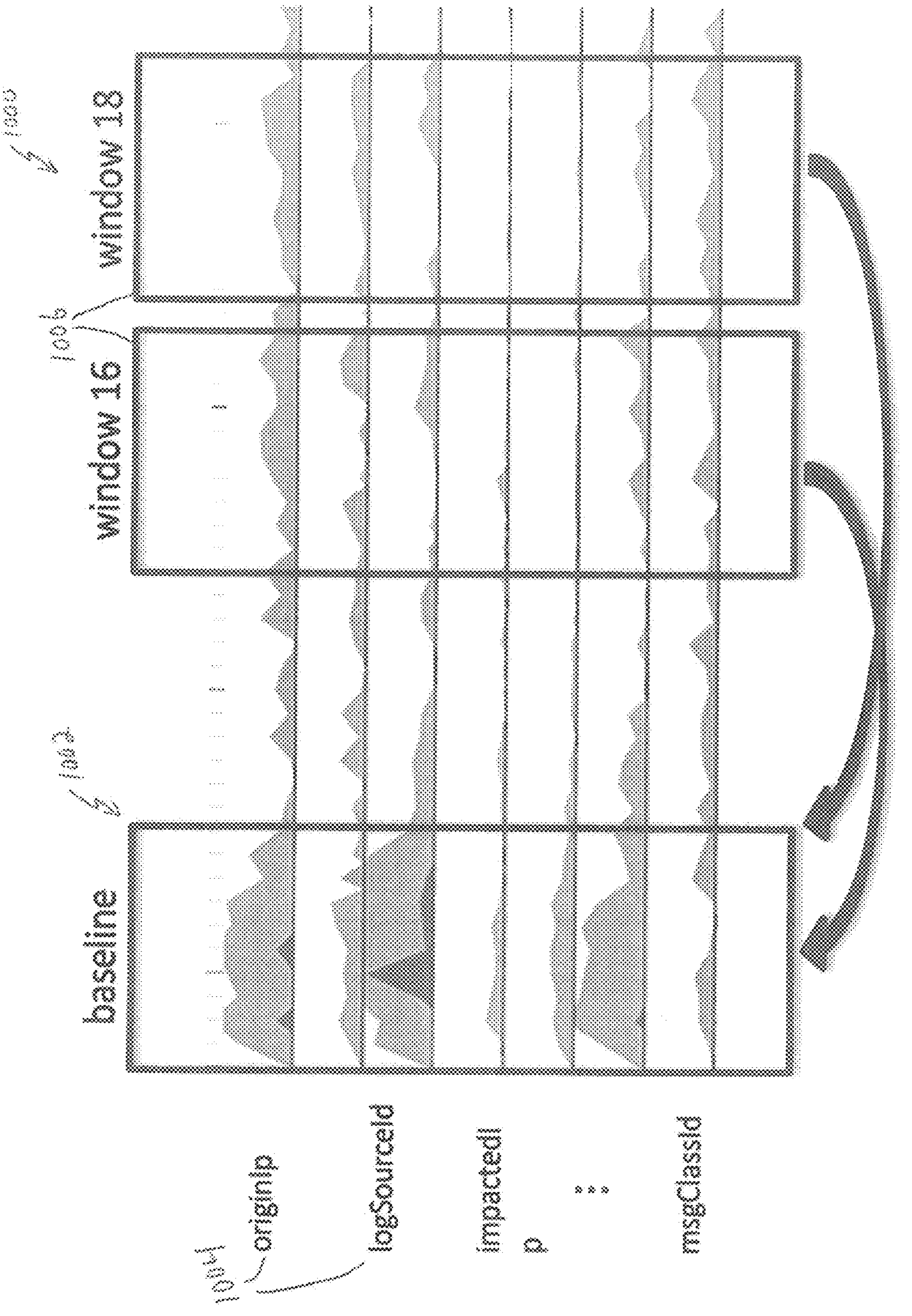
FIG. 10 illustrates comparison of time slices of data to a baseline in accordance with the present invention.

The modeling process 1000 is generally illustrated in FIG. 10. In a modeling process, data is analyzed to develop a baseline 1002. The baseline 1002 may be developed by monitoring an information system or user activity over a period of time and may continually evolve as additional data is obtained. As shown, the baseline 1002 may be developed with regard to a number of dimensions or parameters denoted features 1004 associated with a number of entities or data fields.

Subsequently or concurrently, data may be received for evaluation. The data may be parsed into time slices or windows 1006. Corresponding processing components are used in developing the baseline 1002 and comparing the data of windows 1006 to the baseline 1002. Such comparison may involve individual parameters or combinations thereof.

The analysis employed for this comparison e.g., to detect events and to score, rank, and apply an attribution to the detected events, will vary depending on the use case. Moreover, the details of the pre-processing, feature engineering and feature scaling depend on the analytics employed in modeling. Detailed examples in this regard will be provided in the following section. A brief discussion of modeling follows to facilitate understanding of the processing pipeline 500 (FIG. 5A).

There are many types of analytics that can be employed in the processing pipeline architecture. The analytics that are described below include, among others, vector space anomaly detection algorithms that may be grouped as distance-based algorithms, classification based algorithms, probability-based algorithms, decomposition-based algorithms, restricted Boltzmann machine algorithms and combinations thereof. Principal component analysis will first be described. It will be understood that these particular analytics are described to illustrate the operation of the invention and the invention is not limited to these algorithms or categories of algorithms.

Figure 11:
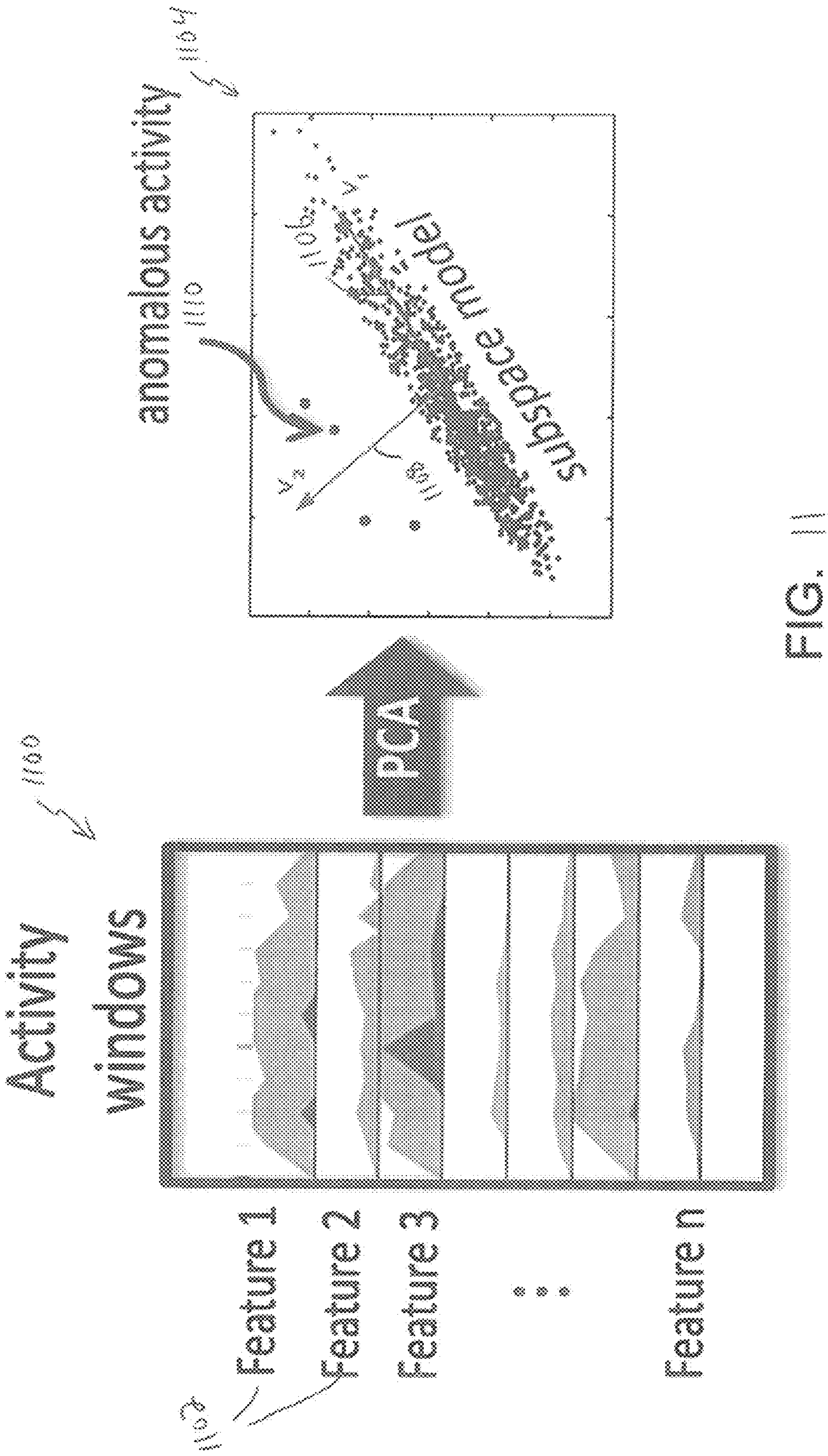
FIG. 11 is a graph depicting a principal component analysis process in accordance with the present invention.

Principal component analysis is an example of a decomposition-based algorithm where a set of observations with potentially correlated features are decomposed into a set of orthogonal/uncorrelated component dimensions. This is graphically depicted in FIG. 11. As shown, the analysis as applied with respect to activity windows 1100 of data in a fitting or transformation process. As described above, the data includes a number of dimensions or parameters denoted as features 1102.

Subspace modeling is used to learn a geometric representation for the data. Specifically, principal component analysis can be employed to yield a subspace model 1104 including, in the illustrated implementation, first and second components 1106 and 1108. Thus, the baseline can be decomposed into the building block components. From these building blocks, a low-dimensional subspace model can be constructed for modeling baseline variance. Time windows can then be constructed using the baseline's building blocks. The analysis then reveals anomalous activity 1110 as outliners in the subspace model. The anomalies may be quantified by various techniques such as Mahalanobis distance, subspace projection, and support vector machines to learn decision boundaries.

Figure 12:
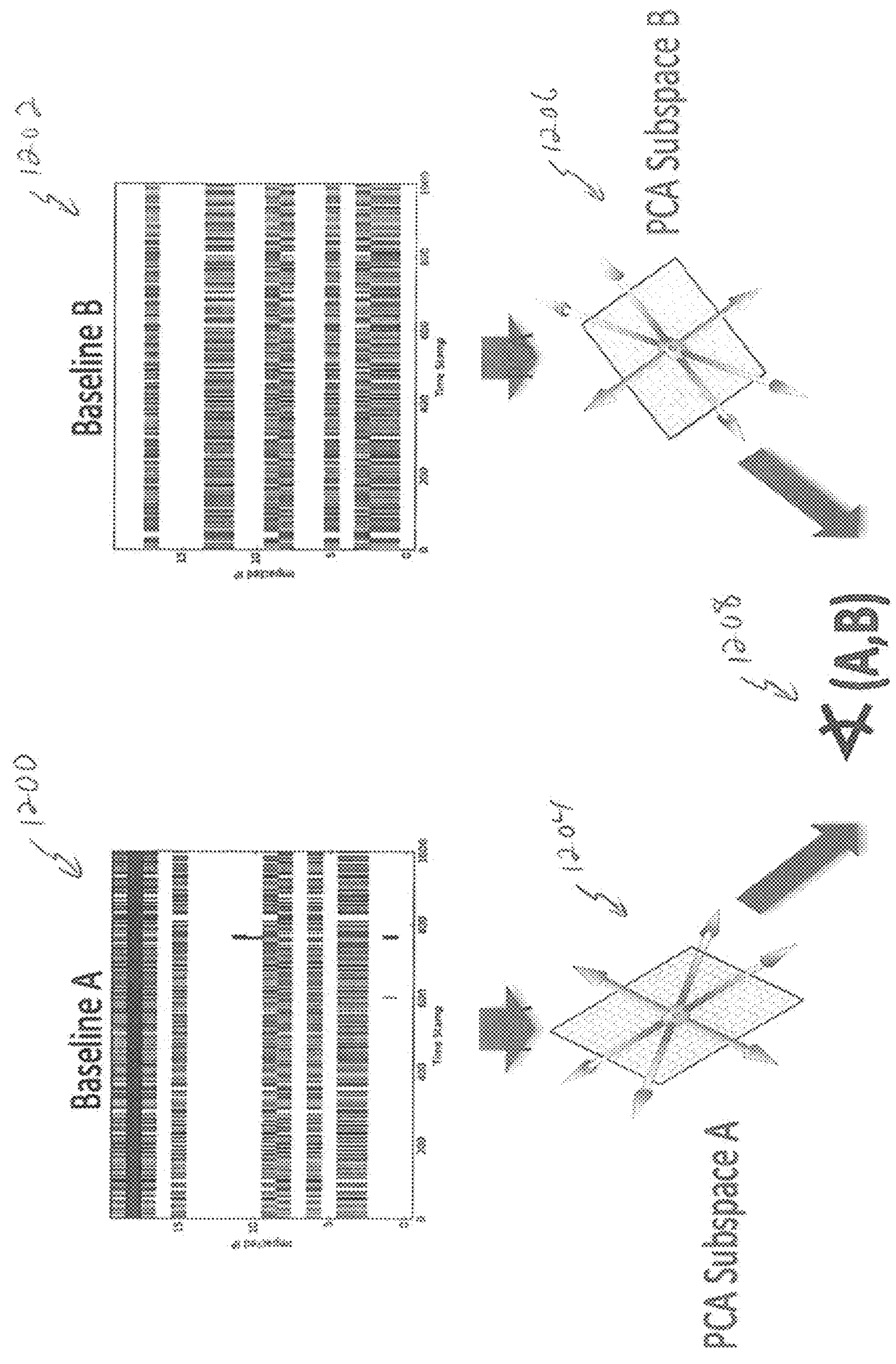
FIG. 12 illustrates the use of principal component analysis and subspace models to define similarity or distance between data sets or objects in accordance with the present invention.

The principal component analysis and subspace models can be used to define similarity or distance between data sets or objects. This is illustrated in FIG. 12. In this case, baseline A 1200 and baseline B 1202 are compared. Each baseline 1200, 1202 is processed using a principal component analysis to yield a subspace 1204, 1206 having a number of components. The angle 1208 between the resulting subspaces then provides a measure of distance or similarity between the data.

Figure 13:
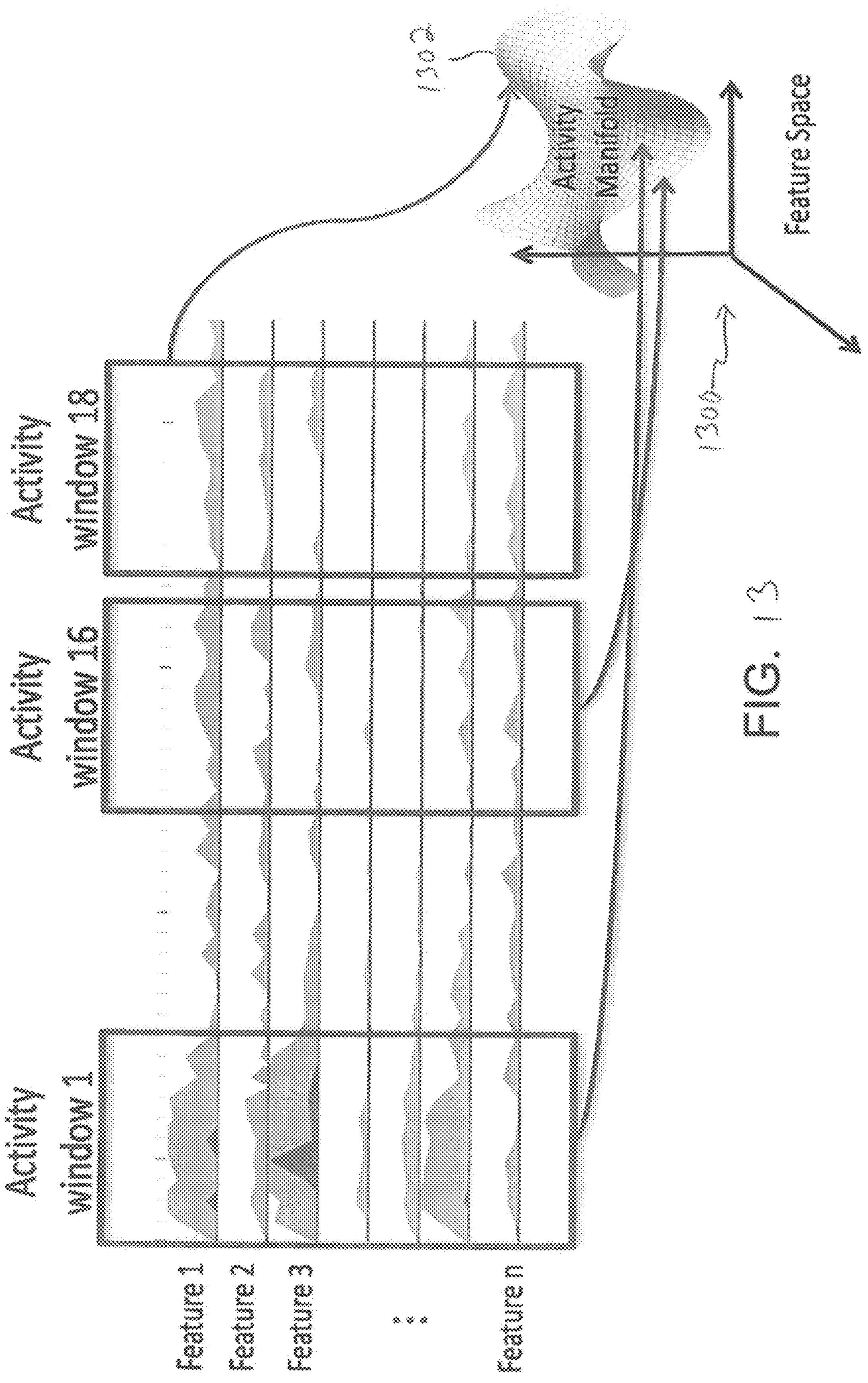
FIG. 13 illustrates definition of a subspace model in relation to a multidimensional feature space in accordance with the present invention.

Anomalies can be detected in relation to a multidimensional feature space. As described above, a baseline may include a number of features. As shown in FIG. 13, the associated feature vectors can be modeled as coordinates in a low-dimensional feature space 1300 so that the baseline or a subset thereof is represented as an activity manifold 1302. Large distances from the manifold 1302 then indicate anomalous activity.

Figure 14:
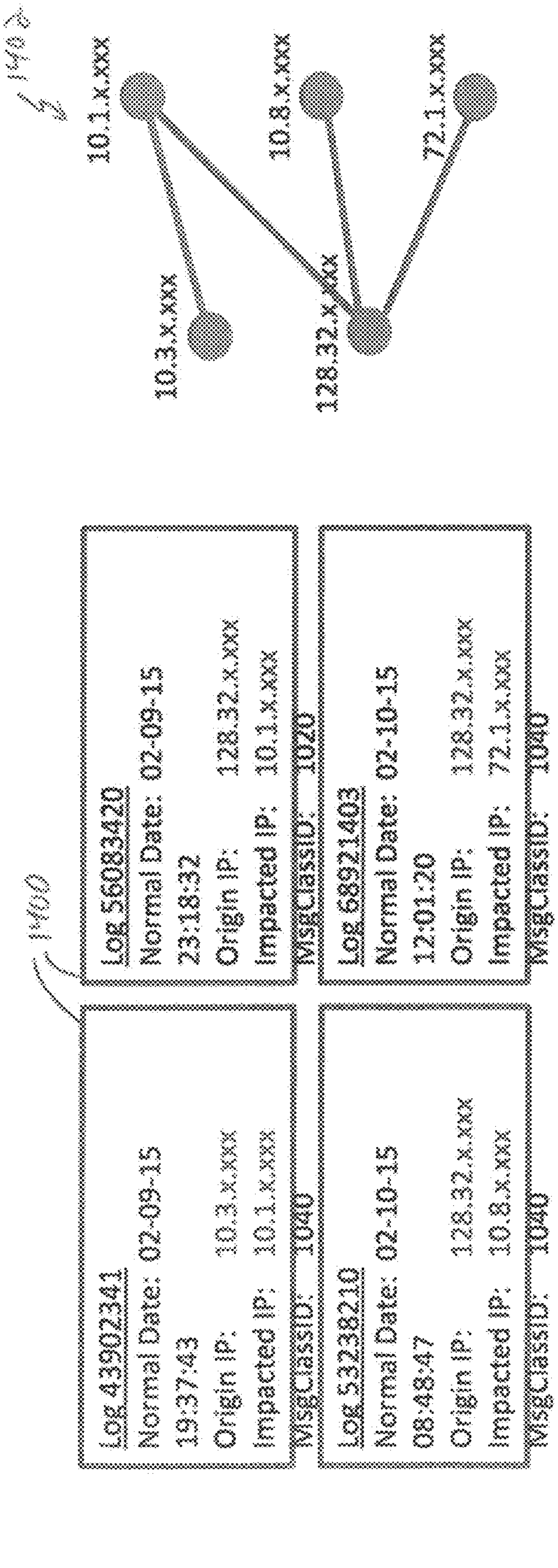
FIG. 14 illustrates graphical encoding of relationships from log data in accordance with the present invention.
Figure 15:
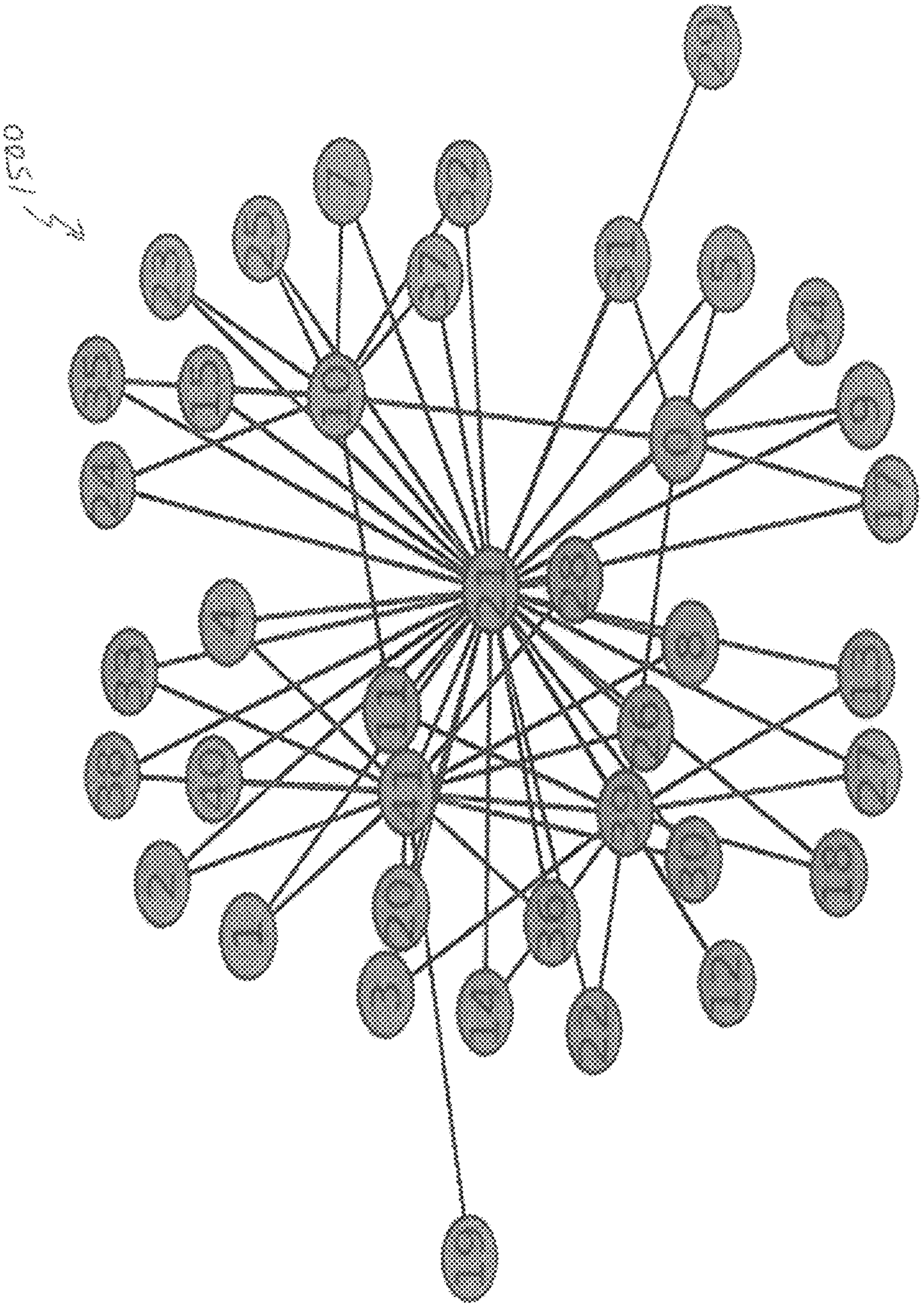
FIG. 15 illustrates graph model encoding relationships in accordance with the present invention.

Modeling of relationships as well as anomaly detection and characterization can also be implemented using graph tensor analysis. FIG. 14 illustrates a number of logs 1400 that each include an origin IP address and an impacted IP address. Those logs 1400 can be used as described above to construct a graph model 1402 that includes nodes and edges. FIG. 15 illustrates a more complex graph model 1500 where nodes and edges are represented in a feature space.

The similarity or disparity between IPs, hosts, and endpoints can be determined in relation to appropriate distance metrics of graph model. A random walk or Markov random process can be implemented on the graph in this regard. The information flow or commute along graph edges can then be measured. This analysis may reveal various attributes related to similarity, e.g., 10.1.X.XXX's closest neighbor in the embedded space is 128.1.X.XXX or hosts A, B, and C from a distinct cluster that excludes host D.

Figure 16:
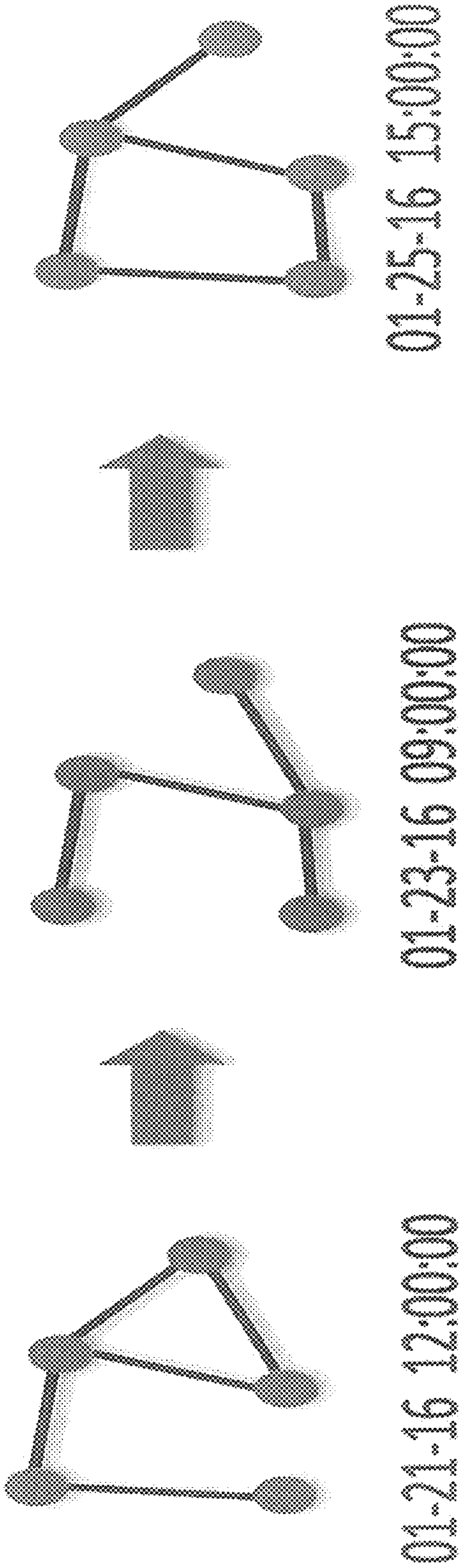
FIG. 16 illustrates the use of graph dynamics for anomaly detection in accordance with the present invention.
Figure 19:
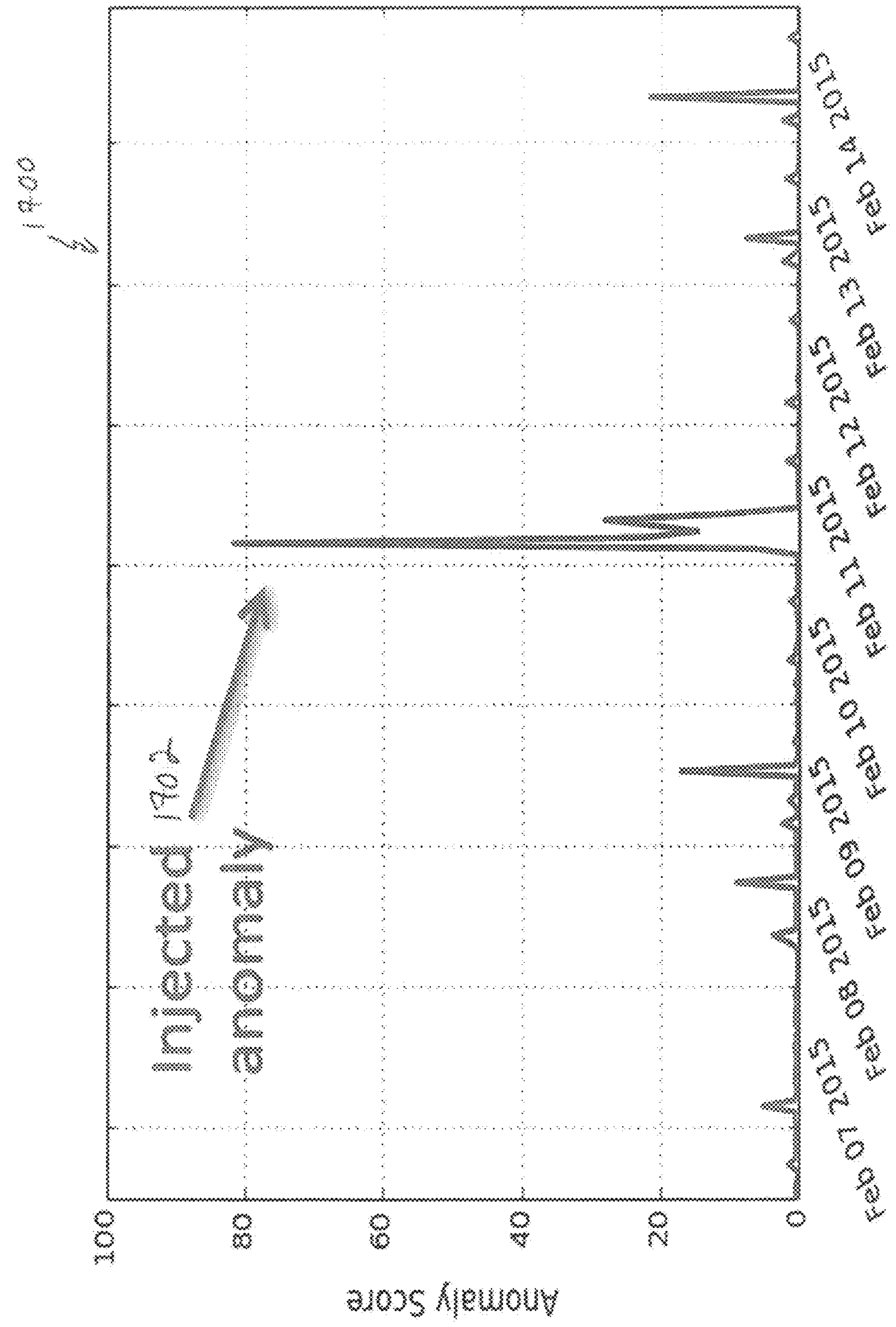

FIG. 16 illustrates how graph dynamics can be used for anomaly detection. Specifically, FIG. 16 shows a time series of graph model snapshots for a given user account. As shown, the graph models thus encode changes in account activity over time. Such a time series of graph models can reveal changes in node connections (e.g., mode similarities/distances, release rankings, and clusters) and edges (new edge connections, improbable edges, edge detections). Thus, structural and connectivity properties change with new observations and some such changes may be identified as anomalies for further analysis.

One issue that arises in connection with the machine-learning process relates to the data used in the modeling process, e.g., to develop a baseline. As noted above, labeled, ground-truth training data is often unavailable. There are several approaches that can be employed to address this concern. First, a baseline may be developed using system data from a specified period in time. In this approach, the data from the selected time period is treated as normal. As such, any malicious or otherwise aberrant behavior is modeled as normal which may interfere with proper identification of anomalies in subsequent analysis. Some algorithms will statistically improve performance over time as any aberrant data "whites out" in relation to more common normal data.

Another approach is to attempt to clean the baseline data. In some cases, aberrant data can be identified, either in real-time or as a matter of forensics. Such methods can include statistical identification and quantification of central trends and variability, outlier removal, and detrending/seasonality corrections. Crowd-sourced methods may also be employed whereby statistics collected across user accounts (generally of a single organization) inform the notion of normal at the individual account level.

Still another approach involves analyzing different baseline time periods. As noted above, some algorithms allow the baseline to continually evolve. In other cases, e.g., due to the computational burden of re-computing the model, one or more static baseline time periods are more practical. In such cases, different baseline time periods (e.g., a week versus a month) may be utilized and comparison of the results can assist in developing an improved baseline. For example, behaviors that are consistent over different baseline models may be considered true normal behavior. In other cases, more recent baselines may be favored, or weighted more strongly, in developing a composite baseline, or a decay factor/mechanism may be employed to de-emphasize older data.

Moreover, the development philosophy for model development can be agnostic or intelligent. In some cases, it may be deemed important to make no assumptions about what anomalies are deemed suspicious, malicious, benign or other. In other cases, a richer data set including contextual information or subject matter expertise may be bought to bear on model development (not just in post-detection analysis as described below).

Performance of individual models or competing models may be tested using test data. For example, data reflecting anomalous behavior may be injected into a data set to verify model performance. FIG. 17 shows an example of this. In the illustrated example, log data was extracted from a STEM system. Anomalous attack-like behavior, of which the algorithms were unaware, was then injected into the data stream. A machine-learning process was then employed to construct a time series of graphs representing activity snapshots. Those snapshots were compared to measure structural/connectively changes for transitions between graphs and compute anomaly scores based on such transitions. The resulting anomaly score graph 1700 is shown in FIG. 17. The graph 1700 readily identifies the anomaly 1702.

2.3 Scoring and Attribution

Referring again to FIG. 5A, the outputs of the illustrated machine-learning process 512 includes attribution 512 and scoring information 510.

It will be appreciated that determining whether an activity is anomalous or not generally involves some consideration of the attributes around the activity. Accordingly, it is at least useful to provide an attribution 512 associating an activity with a particular entity. The attribution may identify an endpoint, a source-to-destination connection, or other entity information. Attributions may be aggregated, e.g., in a histogram of IPs across users, to assist in recognizing true incidents and false positives. Moreover, domain-specific or domain-general knowledge can be applied, manually or automatically, to identify a series of events or aggregation of events for a particular entity or related entities that may indicate a known threat. Such attribute information may assist in identifying and labeling anomalies. In the context of anomalies identified in relation to a baseline, scoring is a way of quantifying the degree of deviation from the baseline. Such scoring can be implemented with respect to a defined scale, e.g., 0-100, that enables comparison of events and ranking. With regard to scoring, different models detect anomalies in different manners. For example, for models that yield an activity manifold, the score may be based on some distance determination for data in relation to the manifold. In models that detect anomalies based on graph dynamics, scoring may involve measuring structural/connectively changes for transitions between graphs.

Multiple raw scores may be used to yield a single output score. For example, a set of raw scores for a time period or other data set can be sorted to yield a set of scores for one or more entities (logins, endpoints, etc.). An output score can then be determined for the entity by a sub-selection process (e.g., n highest scores, spike detection) or an aggregation process (e.g., count, mean, sum). Thus, the input into such a scoring process is an N×1 set of anomaly scores and the output is a scaler of overall anomalousness for the data set or time window.

The scoring may be stateless or stateful. For example, as suggested above, a score may be directly determined from a magnitude of deviation from a baseline or other reference. In other cases, a score may be determined in consideration of additional information such as scoring against population statistics. Similarly, scoring may be weighted based on context or domain specific knowledge. In any event, it is useful to generate a score that is normalized in relation to some scale so as to enable ranking. Ranking enables a human or machine user to prioritize consideration of the results, e.g., to first address events representing the greatest threat. It will be appreciated that other factors may be taken into account in this regard, e.g., which entities are most critical.

It is useful to provide not only a score but also contextual information associated with scores or anomalies. That is, it is useful to automatically detect and convey the context in which this behavior occurred so that the end users can understand what these behaviors mean in their environments. Such context may involve related anomalous incidents. For example, in a network security monitoring context, if the models detect an anomalous spike in the number of outgoing bytes from an internal host, it may be useful to provide additional information such as a spike in failed authentications to that host the previous day.

Another type of context information that may be utilized is peer group analysis. The relevance of a peer group may be understood by considering the following hypothetical. A particular user begins accessing new resources—a behavior that might normally be identified as anomalous. However, if one or more peers also begin accessing those resources at the same time, it may be concluded that the behavior is not anomalous; it is simply a new behavior (though it is also possible that it could be anomalous, e.g., a group of users affected by phishing). Peer group analysis handles this issue by measuring behavior with respect to the closest peers, e.g., defined during baseline development. For example, peers may be identified as clusters in principal component analysis similarity space. Drift from peers may then be identified as anomalies with due care to detect anomalous behaviors affecting groups.

Feedback may also be used to tune performance of the machine-learning process. In this regard, feedback from an end user concerning true threats and false positives can improve future performance of the algorithms. For example, an organization could inform the algorithm that, although User X's authentication to a new host was correctly flagged as anomalous, the specific host in question is of no actual concern. The model can then be updated to assign less weight to authentications to this host. Such weighting can be implemented in various ways on a model-specific basis to impact event detection and/or scoring.

Similarly, reinforcement learning and active learning may be implemented. Reinforcement learning focuses on online updating of a decision policy based on observed results. Active learning is a semi-supervised machine-learning framework whereby a model may be updated as specifically selected examples are provided.

2.4 Alternate Pipeline and Summary

Figure 5B:
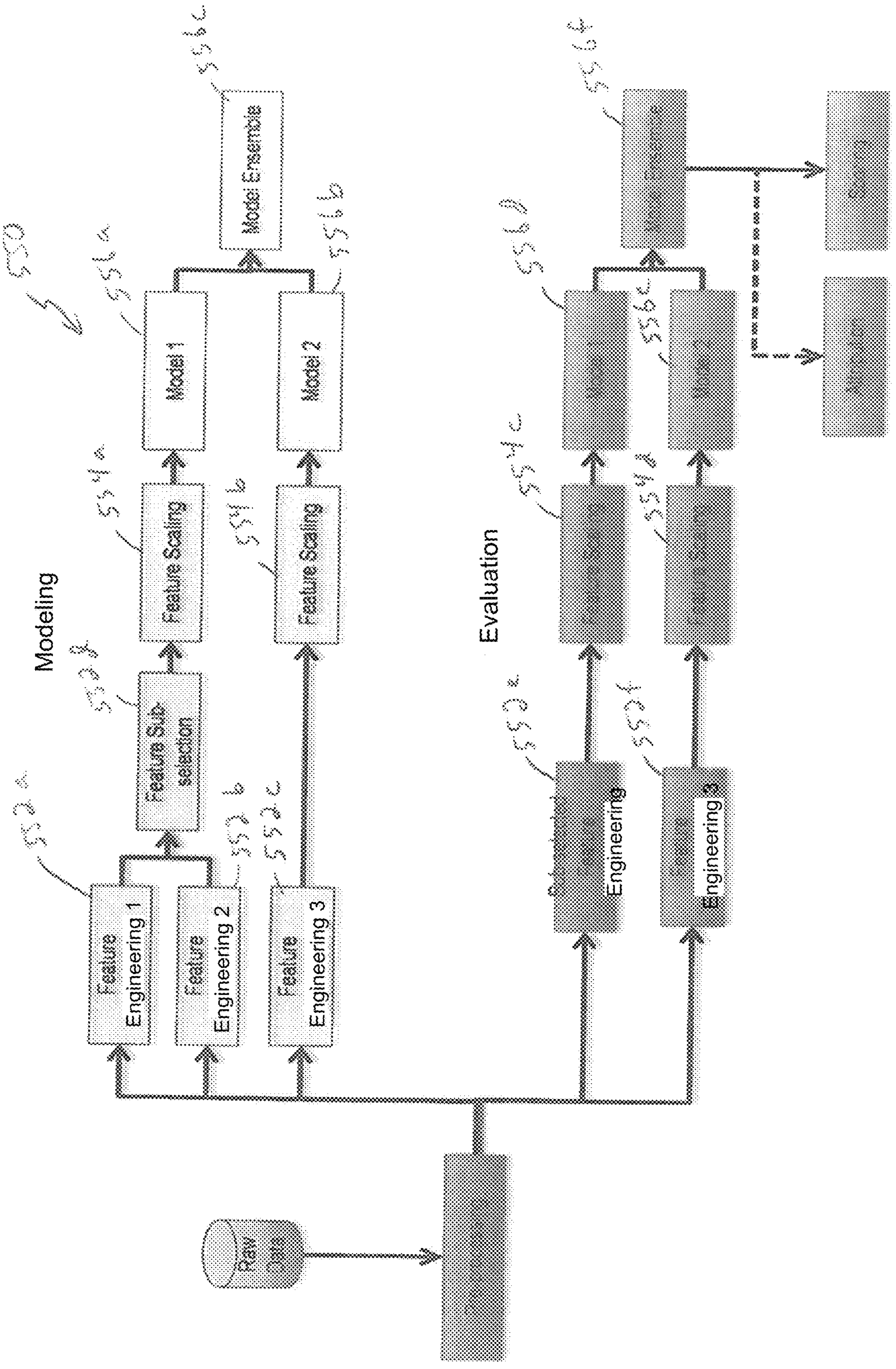

While the foregoing description of the processing pipeline has focused on the simple case of a single feature engineering module and a single model module, more complex pipeline systems can be implemented. For example, as shown in FIG. 5B an alternate processing pipeline 550 may include multiple feature engineering modules 552*a*, 552*b*, 552*c* in the modeling branch associated with multiple modeling modules 556*a*, 556*b*. In some cases, a feature subselection module 552*d* may compare or combine extracted features (e.g., 552*a* and/or 552*b*) to support a modeling module 556*a*. In this regard, for example, the principal component analysis can identify optimal features or combinations thereof for analysis. The models 556*a*, 556*b* may be combined in a model ensemble 556*c* to yield optimal results. It will be appreciated that feature scaling modules 554*a*, 554*b* can be employed to ensure that the extracted feature data is scaled so as to facilitate useful comparisons or combinations. Corresponding feature engineering modules 552*e*, 552*f*, feature scaling modules 554*c*, 554*d*, and model modules 556*d*, 556*e*, 556*f* can be employed in the transform branch. It will be appreciated that many other processing pipeline configurations are possible.

Figure 18:
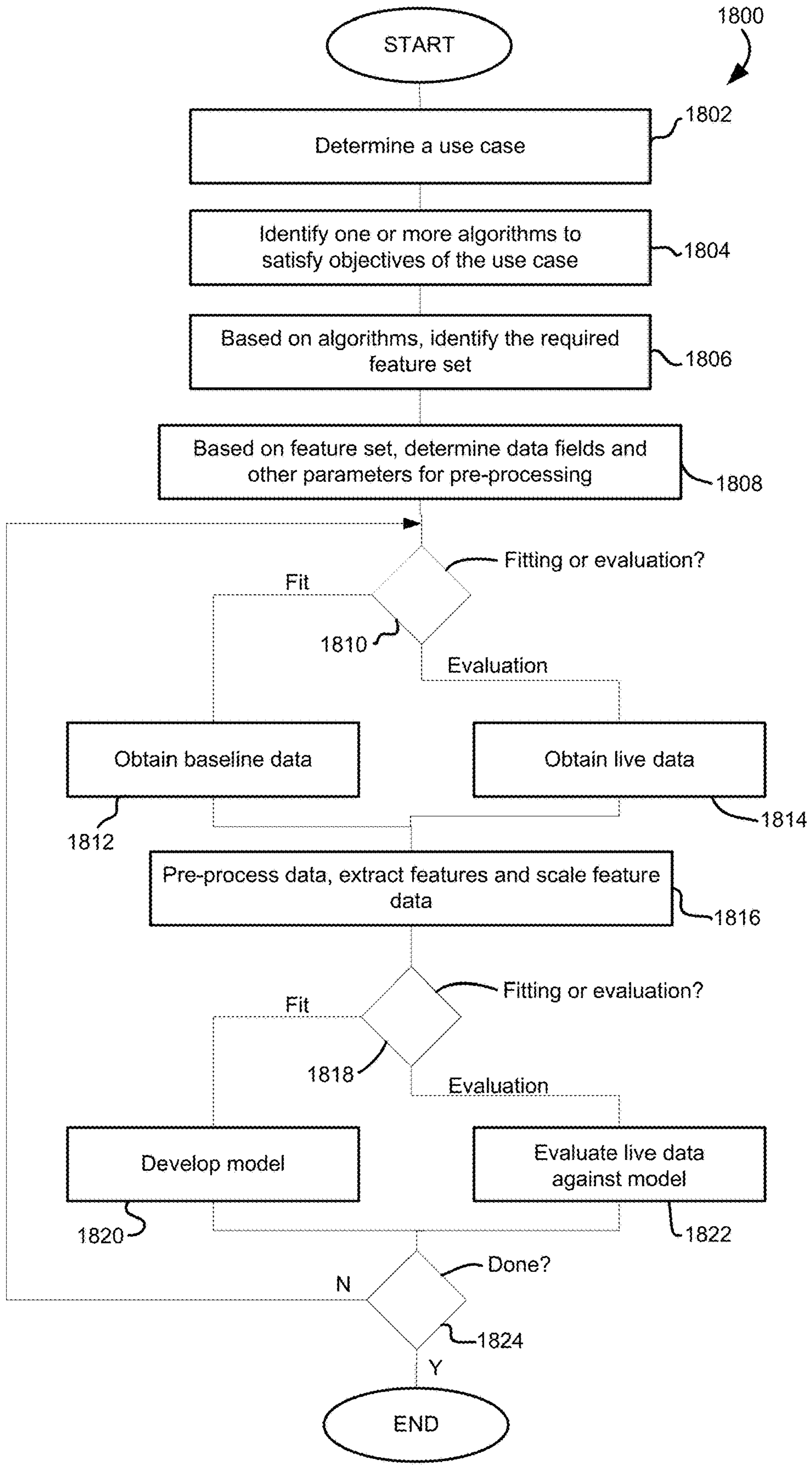
FIG. 18 is a flowchart illustrating a machine-learning process in accordance with the present invention.

FIG. 18 is a flow chart that summarizes a machine-learning process 1800 in accordance with the present invention. As described at various points above, much of the processing is dependent on the data environment and the particular use case. Accordingly, the illustrated process 1800 is initiated by determining (1802) a use case. In the exemplary application of machine analytics for threat detection, examples of use cases include identifying compromised user credentials or compromised endpoints.

Depending on the specific use case, one or more algorithms may then be identified (1804) to satisfy the objectives of the use case. As will be described in more detail below, different algorithms have been found to perform better for different objectives. In addition, in some cases, one algorithm may provide efficient anomaly detection whereas another algorithm yields suitable information for attribution. Accordingly, based on experience or testing with regard to a specific data environment and use case, appropriate algorithms can be selected.

Different algorithms may require a different set of features. Accordingly, the illustrated machine-learning process 1800 identifies (1806) the required feature set based on the selected algorithms. Moreover, a larger set of features of an overall feature space may be used for data fitting whereas a smaller feature set corresponding to a developed subspace model may suffice for certain transformation processes. In turn, based on this feature set, a set of data fields and other parameters for pre-processing can be determined (1808).

The machine-learning process 1800 diverges at the decision block 1810 depending on whether the machine-learning process 1800 is being employed for data modeling (e.g., baseline development) or data evaluation (e.g., processing live data). In the case of data modeling, the machine-learning process 1800 proceeds by obtaining (1812) baseline data. As noted above, development of baseline may be based on one or more static data sets or continually developing data set. In the data evaluation case, a live data stream may be obtained (1814). It should be appreciated that data evaluation may also be conducted with respect to a selected set of data, e.g., for forensic analysis. In any case, the data may be pre-processed (1816) as described above, features may be extracted and the feature data may be scaled.

The machine-learning process 1800 diverges again at decision block 1818 depending on whether the machine-learning process 1800 is being used for data modeling or data evaluation. In the case of data modeling, the baseline data may be processed to develop (1820) a model. The model may provide a baseline as well as mechanisms for identifying and quantifying events where data diverges from the baseline. In the case of data evaluation, the previously developed model is applied (1822) to data under analysis. In either case if baseline development or data processing is not complete, the machine-learning process 1800 can return, in connection with decision block 1824, to obtain more data and loop through the associated processing steps.

As noted above, many of these steps are dependent on selecting appropriate analytics (e.g., an algorithm or set of algorithms), for the machine-learning process. This will be better understood upon consideration of the examples described in more detail below.

3. Specific Analytics

As described above, a variety of analytics and combinations thereof can be employed in the machine-learning process. While some of these have been mentioned above, this section will describe some examples of analytics. The details of these algorithms are not set forth as it is believed that these algorithms are well-known to those skilled in the field and some specifics will, in any case, be dependent on the use case and data environment. While the examples below have proved effective for certain use cases, it is anticipated that other analytics will be useful in these and other use cases.

The following algorithms, which are set forth in the exemplary context of vector space anomaly detection include distance-based algorithms, classification-based algorithms, probability-based algorithms, decomposition-based algorithms, and a restricted Boltzmann machine algorithm.

3.1 Distance-Based 3.1.1 Local Outlier Factor

The local outlier factor (LOF) measures the local deviation of each observation with respect to its k-nearest neighbors. LOF is capable of detecting anomalies due to extreme values, anomalies in sparsely populated parts of the vector space, and anomalies composed of several points. LOF is widely used in intrusion detection tasks and often outperforms competing algorithms and its ability to make use of local (relative) distances. However, a major drawback is that anomalies cannot be attributed to a particular dimension of the vector space. Extensions such as the local correlation integral (LOCI) can help users determine the nature of the anomaly (e.g., a single extreme value, an edge observation, etc.), which could be potentially useful information. The DBSCAN algorithm is also related, and might help with anomaly attribution.

3.1.2 K-Nearest Neighbors

Outlier detection using k-nearest neighbors (kNN) operates similarly to the Local Outlier Factor, except that it does not compute the deviation of each observation with respect to is k-nearest neighbors' local deviations. Instead, it produces a similarity-weighted average of each test observation from the k-nearest training observations. Anomaly scores are computed as deviations from this average, which can be attributed to individual dimensions of the vector space.

3.1.3 Mahalanobis Distance

The Mahalanobis distance is generalized measure of distance between a given point and distribution. It can be thought of as the multi-dimensional generalization of a z-score. One drawback of the Mahalanobis distance is that it requires inverting the covariance matrix, which can be singular when the number of features is much larger than the number of observations (and is exacerbated when there are duplicate observations). There are ways to approximate the covariance matrix and perform inversion. One implementation instead uses the pseudo-inverse of the empirical covariance matrix.

3.2 Classification-Based 3.2.1 One-Class Support Vector Machine

The support vector machine (SVM) is a supervised learning algorithm that finds a projection of the data that maximally separates the nearest observations from each class. The algorithm can be reduced to a single class by maximally separating all training observations from the origin. New observations are then classified as inliers to the trained class or as outliers.

3.3 Probability-Based 3.3.1 Naive Bayes

Naive Bayes encompasses a set of supervised algorithms that model data as conditional and prior probabilities learned from the training observations. Naive Bayes involves multiplying probabilities, which is typically done in log space for numerical stability. Importantly, if a feature has a zero probability, it will wipe out all information in the probabilities of other features when they are multiplied (or summed in log space). To correct for this, Laplace/Lidstone smoothing is typically used in which a small correction is applied to all feature probabilities.

3.4 Decomposition-Based 3.4.1 Principal Component Analysis

As noted above, Principal component analysis (PCA) decomposes a set of observations with potentially correlated features into a set of orthogonal/uncorrelated component dimensions. The component dimensions are ordered in descending order in terms of how much variance they explain across observations. Anomalies are detected by reconstructing the original data using the component dimensions, with anomalous data points being poorly accounted for by the PCA model.

PCA can detect composite changes in features, unlike probabilistic-based anomaly detectors. PCA is a linear algorithm, but can be extended to detect non-linear composite features using Kernel PCA.

PCA is limited with respect to detecting shifts in frequency, since this type of shift can be accounted for with the component dimensions. Therefore, it makes most sense to couple PCA with a frequency-based detector, or the Mahalanobis distance. It is also important to note that PCA is highly sensitive to overfitting outlier observations in the training data, since they will likely explain a large amount of variance.

3.4.2 Autoencoder

An autoencoder is a form of neural network that encodes its input, typically in a lower dimensional representation using an M×N weight matrix of size where M is the dimensionality of the input observations and N is the user-defined encoding dimensionality. Weights are learned using an optimization method such as gradient descent that minimizes the cost of reconstructing the input from the encoding using the transpose of the weight matrix.

Autoencoders can detect composite shifts in features, including nonlinear combinations when using a nonlinear activation function. Furthermore, autoencoders can be stacked so that they can perform incremental dimensionality reduction, which typically performs better than minimizing the cost of one large dimensionality reduction and provides a more robust setting for N. An extension to the autoencoder is the denoising autoencoder which perturbs input x with noise and attempts to reconstruct the denoised signal. This is useful for discovering more robust lower dimensional representations.

3.5 Ensemble/Meta-Algorithms 3.5.1 Bootstrap Aggregating (Bagging)

Bootstrap aggregating (bagging) refers to repeatedly subsampling the set of training observations (with replacement) and fitting a model to each different subsample. The models outputs are averaged for test observations. The effect of bagging is that each model is biased in a slightly different way according to its specific subsample, but the ensemble exhibits less systematic bias than a single model fit on the entire set of training observations.

3.6 Restricted Boltzmann Machine

The restricted Boltzmann machine (RBM) is a neural network that models its inputs as a probability distribution. It shares some aspects with decomposition-based methods, chiefly its ability to reconstruct inputs given a probability distribution, and thus can be used for anomaly detection in the same way as decomposition-based methods. RBMs can discover nonlinear combinations of features when using a nonlinear activation function (typically sigmoidal) and can be stacked in a way similar to autoencoders.

The "restricted" part of the RBM refers to the fact that the weighted connections between units must form a bipartite graph. This allows much faster training using gradient-based methods (see Contrastive Divergence).

3.7 Other Considerations and Observations

First, it is clear that no one algorithm is perfect. There are tradeoffs in what types of anomalies algorithms are capable of detecting, biases, and runtime complexity. The best solution will generally combine several algorithms, but this is clearly more expensive than a single algorithm. A combination of PCA and Bayesian detectors may provide good performance for many applications with low computational complexity that can attribute anomalies to a particular dimension of vector space, aiding end-user interpretation. Another option is to combine PCA with the Mahalanobis distance to measure small frequency-based changes within the low dimensional representation (this would be as simple as computing the Mahalanobis distance of the PCA-transformed data).

It will be appreciated that may other types of algorithms and specific algorithms and combinations are possible depending on the data environment and use case. These may operate in connection with other features and mathematical representations of the data. The data may be harvested and pre-processed in any appropriate manner to provide information to support the analyses. Moreover, the data may be post-processed (after the machine-learning process) to provide additional context and value, and to generate warnings and presentations as desired.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed:

1. An information monitoring system for using advanced analytics to analyze data, comprising:

a structured data manager configured to:

obtain system data generated by one or more platforms, the system data being transmitted over at least one communications network;

establish a feature representation for the system data, the feature representation including a number of features for characterizing the system data; and process the system data by modeling the system data relative to a set of at least some of the features of the number of features and generate a model of the system data, wherein: establishing the feature representation includes one of vectorization and tensorization of the system data in relation to a defined set of dimensions that support particular analytics of particular use cases; and the model of the system data is optimized for an objective use case related to information monitoring; and the model of the system data is used to evaluate the system data with respect to the objective use case.

2. The information monitoring system of claim 1, wherein processing the system data comprises obtaining a set of system data that includes both normal data that is characteristic of normal behavior of one or more entities and anomalous data and applying analytics to the set of system data.

3. The information monitoring system of claim 2, wherein modeling the system system data involves determining a set of features of the number of features such that the set of features is optimized for discriminating between the normal data and the anomalous data.

4. The information monitoring system of claim 1, wherein the particular analytics comprise one of a machine learning process, a statistical process, and a computational algorithm.

5. The information monitoring system of claim 4, wherein processing the system data comprises selecting, from a set of different types of machine-learning algorithms, one or more algorithms, wherein the one or more algorithms are effective for one or more of representing baseline behavior (modeling), identifying deviations from the baseline behavior (anomaly detection), and quantifying a degree of a deviation (scoring).

6. The information monitoring system of claim 5, wherein the set of different types of machine-learning algorithms includes one or more of distance-based, classification-based, probability-based, decomposition-based, and restricted Boltzmann machine algorithms, and processing comprises applying one or more of the set of different types of machine-learning algorithms to a set of test data to determine an effectiveness of each of the one or more of the set of different types of machine-learning algorithms.

7. The information monitoring system of claim 6, wherein the effectiveness is determined in relation to one or more of a sensitivity and a specificity in relation to identifying events of interest.

8. A monitoring system for use in information system monitoring, comprising:

a structured data manager configured to:

obtain system data generated by one or more platforms and transmitted over at least one communications network;

extract features from the system data, the features extracted by developing a model to process the system data, the features corresponding to a model implemented by an analytics module, wherein extracting includes one of vectorization and tensorization of the system data;

operate the analytics module to apply the model to the system data so as to identify an event of interest; and provide output information concerning the event of interest.

9. The monitoring system of claim 8, wherein:

extracting involves identifying a feature space and mapping the system data to the feature space; and converting non-numeric portions of the system data to numeric data is in relation to a defined set of dimensions that supports particular analytics of particular use cases.

10. The monitoring system of claim 8, wherein vectors each include N observations for each of P features.

11. The monitoring system of claim 10, wherein each vector is aggregated over a defined time window of structured data.

12. The monitoring system of claim 8, wherein extracting comprises converting the system data into tensors each including N observations for each of a set of multidimensional data.

13. The monitoring system of claim 8, wherein operating comprises developing a baseline of behavior based on the system data.

14. The monitoring system of claim 8, wherein operating comprises identifying an anomaly based on a deviation from a baseline of behavior based on observations of the behavior.

15. A network monitoring and information management system, comprising:

a structured data manager, configured to:

identify a use case with respect to processing system data, the system data comprising data generated by one or more platforms and transmitted over at least one communications network;

select one or more machine-learning algorithms applicable to one or more objectives of the use case;

obtain a set of system data amendable to processing using the one or more machine-learning algorithms, wherein the obtaining includes converting the system data into tensors in relation to a defined set of dimensions that support the selected one or more machine-learning algorithms; and process the set of system data using the one or more machine-learning algorithms to provide output information related to one or more objectives of the use case.

16. The network monitoring and information management system of claim 15, wherein the one or more objectives include identifying behavior of interest with respect to a monitored information environment of the one or more platforms.

17. The network monitoring and information management system of claim 16, wherein determining comprises selecting, from a set of different types of machine-learning algorithms, the one or more machine-learning algorithms, wherein the one or more machine-learning algorithms are effective for one or more of representing baseline behavior (modeling), identifying deviations from the baseline behavior (anomaly detection), and quantifying a degree of a deviation (scoring).

18. The network monitoring and information management system of claim 16, wherein modeling includes developing a representation of the system data with respect to a feature space composed of a number of features of the system data.

19. The network monitoring and information management system of claim 18, wherein modeling comprises constructing a statistically optimal subspace of the feature space using one of the selected machine-learning algorithms.

20. The network monitoring and information management system of claim 17, wherein the set of different types of machine-learning algorithms includes at least one of distance-based, classification-based, probability-based, decomposition-based, and restricted Boltzmann machine algorithms, and the determining comprises applying one or more of the set of different types of machine-learning algorithms to a set of test data to determine an effectiveness of each of the one or more of the set of different types of machine-learning algorithms.

* * * * *